(12) United States Patent
Lam et al.

(10) Patent No.: US 8,021,744 B2
(45) Date of Patent: Sep. 20, 2011

(54) FULLY FIBROUS STRUCTURE FRICTION MATERIAL

(75) Inventors: Robert C. Lam, Rochester, MI (US); In Seok Oh, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 1055 days.

(21) Appl. No.: 10/871,786

(22) Filed: Jun. 18, 2004

(65) Prior Publication Data

US 2005/0281971 A1    Dec. 22, 2005

(51) Int. Cl.
*B28B 23/00* (2006.01)
*B29D 22/00* (2006.01)
*D04H 1/00* (2006.01)

(52) U.S. Cl. .................. 428/292.1; 428/36.4; 428/36.92

(58) Field of Classification Search ............... 428/36.92, 428/36.4, 292.1, 319.1, 311.51
See application file for complete search history.

(56) References Cited

U.S. PATENT DOCUMENTS

| | | |
|---|---|---|
| 1,039,168 A | 9/1912 | Melton |
| 1,682,198 A | 8/1928 | Sitton |
| 1,860,147 A | 5/1932 | Hadley |
| 2,100,347 A | 11/1937 | Nanfeldt |
| 2,182,208 A | 12/1939 | Nason |
| 2,221,893 A | 11/1940 | White |
| 2,307,814 A | 1/1943 | Walters |
| 2,316,874 A | 4/1943 | Kraft |
| 2,354,526 A | 7/1944 | Lapsley et al. |
| 2,516,544 A | 7/1950 | Breeze |
| 2,555,261 A | 5/1951 | Walters |
| 2,702,770 A | 2/1955 | Steck |
| 2,749,264 A | 6/1956 | Emrick |
| 2,779,668 A | 1/1957 | Daniels |
| 3,020,139 A | 2/1962 | Camp et al. |
| 3,080,028 A | 3/1963 | Kennedy |
| 3,215,648 A | 11/1965 | Duffy |
| 3,270,846 A | 9/1966 | Arledter et al. |
| 3,429,766 A | 2/1969 | Stormfeltz |
| 3,520,390 A | 7/1970 | Bentz |
| 3,526,306 A | 9/1970 | Bentz |
| 3,578,122 A | 5/1971 | Magnier |
| 3,654,777 A | 4/1972 | Grundman |
| 3,746,669 A | 7/1973 | Dunnom |
| 3,871,934 A | 3/1975 | Marin |
| 3,885,006 A | 5/1975 | Hatch et al. |
| 3,899,050 A | 8/1975 | Savary et al. |
| 3,911,045 A | 10/1975 | Hartmann et al. |
| 3,927,241 A | 12/1975 | Augustin |

(Continued)

FOREIGN PATENT DOCUMENTS

CH    312771 A    2/1956

(Continued)

OTHER PUBLICATIONS

European Search Report—EP 05 25 3694—Oct. 18, 2005.

(Continued)

*Primary Examiner* — Angela Ortiz
*Assistant Examiner* — Camie S Thompson
(74) *Attorney, Agent, or Firm* — Reising Ethington P.C.

(57) ABSTRACT

The present invention relates to a friction material having a fully fibrous content fibrous base material. The base material has dispersed therethrough, in a penetrating gradient, a desired amount of friction modifying particles.

21 Claims, 14 Drawing Sheets

U.S. PATENT DOCUMENTS

| | | | |
|---|---|---|---|
| 3,944,686 A | 3/1976 | Froberg | |
| 3,950,047 A | 4/1976 | Capelli | |
| 3,980,729 A | 9/1976 | Yokokawa et al. | |
| 4,002,225 A | 1/1977 | Marin | |
| 4,020,226 A | 4/1977 | Andrianov et al. | |
| 4,033,437 A | 7/1977 | Labat | |
| 4,045,608 A | 8/1977 | Todd | |
| 4,051,097 A | 9/1977 | Aldrich | |
| 4,084,863 A | 4/1978 | Capelli | |
| 4,098,630 A | 7/1978 | Morse | |
| 4,113,894 A | 9/1978 | Koch, II | |
| 4,150,188 A | 4/1979 | Brulet | |
| 4,197,223 A | 4/1980 | Bartram | |
| 4,209,086 A | 6/1980 | Friedrich | |
| 4,226,906 A | 10/1980 | Jacob | |
| 4,239,666 A | 12/1980 | Jacko et al. | |
| 4,256,801 A | 3/1981 | Chuluda | |
| 4,259,397 A | 3/1981 | Saito et al. | |
| 4,260,047 A | 4/1981 | Nels | |
| 4,267,912 A | 5/1981 | Bauer et al. | |
| 4,291,794 A | 9/1981 | Bauer | |
| 4,320,823 A | 3/1982 | Covaleski | |
| 4,324,706 A | 4/1982 | Tabe et al. | |
| 4,352,750 A | 10/1982 | Eschen | |
| 4,373,038 A | 2/1983 | Moraw et al. | |
| 4,374,211 A | 2/1983 | Gallagher et al. | |
| 4,396,100 A | 8/1983 | Eltze | |
| 4,444,574 A | 4/1984 | Tradewell et al. | |
| 4,451,590 A | 5/1984 | Fujimaki et al. | |
| 4,453,106 A | 6/1984 | La Fiandra | |
| 4,456,650 A | 6/1984 | Melotik et al. | |
| 4,457,967 A | 7/1984 | Chareire et al. | |
| 4,490,432 A | 12/1984 | Jordan | |
| 4,514,541 A | 4/1985 | Frances | |
| 4,522,290 A | 6/1985 | Klink | |
| 4,524,169 A | 6/1985 | Wolff et al. | |
| 4,543,106 A | 9/1985 | Parekh | |
| 4,563,386 A | 1/1986 | Schwartz | |
| 4,593,802 A | 6/1986 | Danko, Jr. | |
| 4,628,001 A | 12/1986 | Sasaki et al. | |
| 4,639,392 A | 1/1987 | Nels et al. | |
| 4,646,900 A | 3/1987 | Crawford et al. | |
| 4,656,203 A | 4/1987 | Parker | |
| 4,657,951 A | 4/1987 | Takarada et al. | |
| 4,663,230 A | 5/1987 | Tennent | |
| 4,663,368 A | 5/1987 | Harding et al. | |
| 4,672,082 A | 6/1987 | Nakagawa et al. | |
| 4,674,616 A | 6/1987 | Mannino, Jr. | |
| 4,694,937 A | 9/1987 | Jonas | |
| 4,698,889 A | 10/1987 | Patzer et al. | |
| 4,700,823 A | 10/1987 | Winckler | |
| 4,726,455 A | 2/1988 | East | |
| 4,732,247 A | 3/1988 | Frost | |
| 4,742,723 A | 5/1988 | Lanzerath et al. | |
| 4,743,634 A | 5/1988 | Royer | |
| 4,770,283 A | 9/1988 | Putz et al. | |
| 4,772,508 A | 9/1988 | Brassell | |
| 4,792,361 A | 12/1988 | Double et al. | |
| 4,861,809 A | 8/1989 | Ogawa et al. | |
| 4,878,282 A | 11/1989 | Bauer | |
| 4,913,267 A | 4/1990 | Campbell et al. | |
| 4,915,856 A | 4/1990 | Jamison | |
| 4,917,743 A | 4/1990 | Gramberger et al. | |
| 4,918,116 A | 4/1990 | Gardziella et al. | |
| 4,927,431 A | 5/1990 | Buchanan et al. | |
| 4,950,530 A | 8/1990 | Shibatani | |
| 4,951,798 A | 8/1990 | Knoess | |
| 4,983,457 A | 1/1991 | Hino et al. | |
| 4,986,397 A | 1/1991 | Vierk | |
| 4,995,500 A | 2/1991 | Payvar | |
| 4,997,067 A | 3/1991 | Watts | |
| 5,004,497 A | 4/1991 | Shibata et al. | |
| 5,033,596 A | 7/1991 | Genise | |
| 5,038,628 A | 8/1991 | Kayama | |
| 5,071,268 A * | 12/1991 | Tanuma et al. | 400/124.05 |
| 5,076,882 A | 12/1991 | Oyanagi et al. | |
| 5,080,969 A | 1/1992 | Tokumura | |
| 5,083,650 A | 1/1992 | Seiz et al. | |
| 5,093,388 A | 3/1992 | Siemon, Jr. et al. | |
| 5,094,331 A | 3/1992 | Fujimoto et al. | |
| 5,101,953 A | 4/1992 | Payvar | |
| 5,105,522 A | 4/1992 | Gramberger et al. | |
| 5,143,192 A | 9/1992 | Vojacek et al. | |
| 5,164,256 A | 11/1992 | Sato et al. | |
| 5,211,068 A | 5/1993 | Spitale et al. | |
| 5,221,401 A | 6/1993 | Genise | |
| 5,233,736 A | 8/1993 | Hill | |
| 5,259,947 A | 11/1993 | Kalback et al. | |
| 5,266,395 A | 11/1993 | Yamashita et al. | |
| 5,269,400 A | 12/1993 | Fogelberg | |
| 5,290,627 A | 3/1994 | Ikuta | |
| 5,313,793 A | 5/1994 | Kirkwood et al. | |
| 5,332,075 A | 7/1994 | Quigley et al. | |
| 5,335,765 A | 8/1994 | Takakura et al. | |
| 5,354,603 A | 10/1994 | Errede et al. | |
| 5,376,425 A | 12/1994 | Asano et al. | |
| 5,395,864 A | 3/1995 | Miyoshi et al. | |
| 5,396,552 A | 3/1995 | Jahn et al. | |
| 5,437,780 A | 8/1995 | Southard et al. | |
| 5,439,087 A | 8/1995 | Umezawa | |
| 5,445,060 A | 8/1995 | Randall et al. | |
| 5,453,317 A | 9/1995 | Yesnik | |
| 5,460,255 A | 10/1995 | Quigley et al. | |
| 5,472,995 A | 12/1995 | Kaminski et al. | |
| 5,474,159 A | 12/1995 | Soennecken et al. | |
| 5,478,642 A | 12/1995 | McCord | |
| 5,501,788 A | 3/1996 | Romine et al. | |
| 5,520,866 A | 5/1996 | Kaminski et al. | |
| 5,529,666 A | 6/1996 | Yesnik | |
| 5,540,621 A | 7/1996 | Keester et al. | |
| 5,540,832 A | 7/1996 | Romino | |
| 5,540,903 A | 7/1996 | Romine | |
| 5,571,372 A | 11/1996 | Miyaishi et al. | |
| 5,585,166 A | 12/1996 | Kearsey | |
| 5,615,758 A | 4/1997 | Nels | |
| 5,620,075 A | 4/1997 | Larsen et al. | |
| 5,639,804 A | 6/1997 | Yesnik | |
| 5,646,076 A | 7/1997 | Bortz | |
| 5,648,041 A | 7/1997 | Rodgers et al. | |
| 5,662,993 A | 9/1997 | Winkler | |
| 5,670,231 A | 9/1997 | Ohya et al. | |
| 5,671,835 A | 9/1997 | Tanaka et al. | |
| 5,674,947 A | 10/1997 | Oishi et al. | |
| 5,676,577 A | 10/1997 | Lam et al. | |
| 5,705,120 A | 1/1998 | Ueno et al. | |
| 5,707,905 A * | 1/1998 | Lam et al. | 442/101 |
| 5,718,855 A | 2/1998 | Akahori et al. | |
| 5,733,176 A | 3/1998 | Robinson et al. | |
| 5,753,018 A | 5/1998 | Lamport et al. | |
| 5,753,356 A | 5/1998 | Lam et al. | |
| 5,766,523 A | 6/1998 | Rodgers et al. | |
| 5,771,691 A | 6/1998 | Kirkwood et al. | |
| 5,775,468 A | 7/1998 | Lam et al. | |
| 5,776,288 A | 7/1998 | Stefanutti et al. | |
| 5,777,791 A | 7/1998 | Hedblom | |
| 5,792,544 A | 8/1998 | Klein | |
| 5,803,210 A | 9/1998 | Kohno et al. | |
| 5,816,901 A | 10/1998 | Sirany | |
| 5,827,610 A | 10/1998 | Ramachandran | |
| 5,834,551 A | 11/1998 | Haraguchi et al. | |
| 5,842,551 A | 12/1998 | Nels | |
| 5,845,754 A | 12/1998 | Weilant | |
| 5,856,244 A | 1/1999 | Lam et al. | |
| 5,858,166 A | 1/1999 | James et al. | |
| 5,858,883 A | 1/1999 | Lam et al. | |
| 5,889,082 A | 3/1999 | Kaminski et al. | |
| 5,895,716 A | 4/1999 | Fiala et al. | |
| 5,897,737 A | 4/1999 | Quigley | |
| 5,919,528 A | 7/1999 | Huijs et al. | |
| 5,919,837 A | 7/1999 | Kaminski et al. | |
| 5,952,249 A | 9/1999 | Gibson et al. | |
| 5,958,507 A | 9/1999 | Lam et al. | |
| 5,965,658 A | 10/1999 | Smith et al. | |
| 5,975,270 A | 11/1999 | Tokune et al. | |
| 5,975,988 A | 11/1999 | Christianson | |
| 5,989,375 A | 11/1999 | Bortz | |
| 5,989,390 A | 11/1999 | Lee | |

| | | | | | | |
|---|---|---|---|---|---|---|
| 5,998,307 | A | 12/1999 | Lam et al. | 2006/0008635 A1 | 1/2006 | Dong et al. | |
| 5,998,311 | A | 12/1999 | Nels | 2006/0019085 A1 * | 1/2006 | Lam et al. ............... 428/304.4 |
| 6,000,510 | A | 12/1999 | Kirkwood et al. | 2006/0062987 A1 | 3/2006 | Niewohner et al. |
| 6,001,750 | A | 12/1999 | Lam et al. | 2006/0121263 A1 | 6/2006 | Komori et al. |
| 6,019,205 | A | 2/2000 | Willworth | 2006/0151912 A1 | 7/2006 | Bauer |
| 6,042,935 | A | 3/2000 | Krenkel et al. | 2006/0241207 A1 | 10/2006 | Lam et al. |
| 6,060,536 | A | 5/2000 | Matsumoto et al. | 2007/0011951 A1 | 1/2007 | Gaeta et al. |
| 6,065,579 | A | 5/2000 | Nels | 2007/0062777 A1 | 3/2007 | Zagrodzki et al. |
| 6,074,950 | A | 6/2000 | Wei | 2007/0117881 A1 | 5/2007 | Watanabe et al. |
| 6,121,168 | A | 9/2000 | Irifune et al. | 2007/0205076 A1 | 9/2007 | Takahashi et al. |
| 6,123,829 | A | 9/2000 | Zommerman et al. | | | |
| 6,130,176 | A | 10/2000 | Lam et al. | FOREIGN PATENT DOCUMENTS | | |
| 6,132,877 | A | 10/2000 | Winckler et al. | | | |
| 6,140,388 | A | 10/2000 | Nass et al. | CH | 1057662 A | 1/1992 |
| 6,163,636 | A | 12/2000 | Stentz et al. | CN | 1500850 A | 6/2004 |
| 6,182,804 | B1 | 2/2001 | Lam | DE | 2828918 A1 | 1/1979 |
| 6,194,059 | B1 | 2/2001 | Yesnik | DE | 2854051 A1 | 6/1979 |
| 6,217,413 | B1 | 4/2001 | Christianson | DE | 2937471 A1 | 3/1980 |
| 6,231,977 | B1 | 5/2001 | Suzuki et al. | DE | 3532795 A1 | 4/1986 |
| 6,265,066 | B1 | 7/2001 | Suzuki et al. | DE | 3622437 A1 | 10/1987 |
| 6,284,815 | B1 | 9/2001 | Sasahara et al. | DE | 3705657 A1 | 9/1988 |
| 6,291,040 | B1 | 9/2001 | Moriwaki et al. | DE | 42 11 010 A1 | 10/1992 |
| 6,315,974 | B1 | 11/2001 | Murdie et al. | DE | 4302773 A1 | 8/1993 |
| 6,316,086 | B1 | 11/2001 | Beier et al. | DE | 19530443 A1 | 10/1996 |
| 6,323,160 | B1 | 11/2001 | Murdie et al. | DE | 10114074 A1 | 9/2002 |
| 6,352,758 | B1 | 3/2002 | Huang et al. | DE | 10157583 C1 | 12/2002 |
| 6,383,605 | B1 | 5/2002 | Ejiri | DE | 102008013907 A1 | 9/2009 |
| 6,387,531 | B1 | 5/2002 | Bi et al. | EP | 0180381 A2 | 5/1986 |
| 6,423,668 | B1 | 7/2002 | Nakanishi et al. | EP | 0202145 A1 | 11/1986 |
| 6,432,151 | B1 | 8/2002 | So et al. | EP | 0352363 B1 | 1/1988 |
| 6,432,187 | B1 | 8/2002 | Ogawa et al. | EP | 0264096 A2 | 4/1988 |
| 6,524,681 | B1 | 2/2003 | Seitz et al. | EP | 0393845 A1 | 10/1990 |
| 6,569,816 | B2 | 5/2003 | Oohira et al. | EP | 0510875 A2 | 10/1992 |
| 6,586,373 | B2 | 7/2003 | Suzuki et al. | EP | 0521843 A1 | 1/1993 |
| 6,601,321 | B1 | 8/2003 | Kendall | EP | 0554902 A1 | 8/1993 |
| 6,630,416 | B1 | 10/2003 | Lam et al. | EP | 0557905 A1 | 9/1993 |
| 6,638,883 | B2 | 10/2003 | Gaffney et al. | EP | 0581696 A1 | 2/1994 |
| 6,652,363 | B2 | 11/2003 | Kramer et al. | EP | 0637698 A1 | 2/1995 |
| 6,668,891 | B2 | 12/2003 | Collis | EP | 0640774 B1 | 3/1995 |
| 6,703,117 | B2 | 3/2004 | Gruber et al. | EP | 0669482 A2 | 8/1995 |
| 6,808,225 | B2 | 10/2004 | Moriyama | EP | 0965887 A1 | 2/1996 |
| 6,831,146 | B2 * | 12/2004 | Aiba et al. ............... 528/129 | EP | 0766019 A1 | 4/1997 |
| 6,855,410 | B2 | 2/2005 | Buckley | EP | 0807766 A1 | 11/1997 |
| 6,875,711 | B2 * | 4/2005 | Chen et al. .................. 442/72 | EP | 0854305 A1 | 7/1998 |
| 6,951,504 | B2 | 10/2005 | Adefris et al. | EP | 0971151 A1 | 1/2000 |
| 7,014,027 | B2 | 3/2006 | Adair et al. | EP | 1039168 A1 | 9/2000 |
| 7,160,913 | B2 | 1/2007 | Schneider | EP | 1 203 897 A | 5/2002 |
| 7,208,432 | B1 | 4/2007 | Beier et al. | EP | 1391629 A1 | 2/2004 |
| 7,294,388 | B2 | 11/2007 | Lam et al. | EP | 1 396 655 A | 3/2004 |
| 7,332,240 | B2 | 2/2008 | O'Hara et al. | EP | 1394438 A1 | 3/2004 |
| 7,429,418 | B2 | 9/2008 | Lam et al. | EP | 1517062 A1 | 3/2005 |
| 2002/0068164 | A1 | 6/2002 | Martin | EP | 1521001 A2 | 4/2005 |
| 2002/0164473 | A1 | 11/2002 | Buckley | EP | 1521007 A2 | 4/2005 |
| 2003/0050831 | A1 | 3/2003 | Klayh | EP | 1614926 A1 | 1/2006 |
| 2003/0053735 | A1 | 3/2003 | Vernooy | EP | 1911990 A2 | 4/2008 |
| 2003/0134098 | A1 | 7/2003 | Bauer et al. | FR | 2430545 A1 | 2/1980 |
| 2003/0154882 | A1 | 8/2003 | Nagata et al. | GB | 1054890 | 1/1967 |
| 2004/0006192 | A1 | 1/2004 | Aiba et al. | GB | 1604827 | 12/1981 |
| 2004/0033341 | A1 | 2/2004 | Lam et al. | GB | 2224285 A | 5/1990 |
| 2004/0043193 | A1 | 3/2004 | Chen et al. | GB | 2241246 A | 8/1991 |
| 2004/0043243 | A1 | 3/2004 | Chen et al. | JP | 55005907 A | 1/1980 |
| 2004/0081795 | A1 | 4/2004 | Wang et al. | JP | 58180573 A | 10/1983 |
| 2004/0081813 | A1 | 4/2004 | Dong | JP | 59103040 A | 6/1984 |
| 2004/0192534 | A1 | 9/2004 | Nixon et al. | JP | 63066230 A | 3/1988 |
| 2004/0198866 | A1 | 10/2004 | Sasaki | JP | 63-152735 | 6/1988 |
| 2004/0224864 | A1 | 11/2004 | Patterson et al. | JP | 1134002 A | 5/1989 |
| 2005/0004258 | A1 | 1/2005 | Yamamoto et al. | JP | 1163056 A | 6/1989 |
| 2005/0025967 | A1 | 2/2005 | Lawton et al. | JP | 1307529 A | 12/1989 |
| 2005/0039872 | A1 | 2/2005 | Kimura et al. | JP | 2017223 A | 1/1990 |
| 2005/0064778 | A1 | 3/2005 | Lam et al. | JP | 3281686 A | 12/1991 |
| 2005/0074595 | A1 | 4/2005 | Lam | JP | 5009458 A | 1/1993 |
| 2005/0075019 | A1 | 4/2005 | Lam et al. | JP | 5247233 A | 9/1993 |
| 2005/0075021 | A1 | 4/2005 | Lam et al. | JP | 5247447 A | 9/1993 |
| 2005/0075022 | A1 | 4/2005 | Lam | JP | 6240233 A | 8/1994 |
| 2005/0075413 | A1 | 4/2005 | Lam | JP | 6299434 A | 10/1994 |
| 2005/0075414 | A1 | 4/2005 | Lam et al. | JP | 07-173301 | 7/1995 |
| 2005/0191477 | A1 | 9/2005 | Dong | JP | 07-151174 | 6/1996 |
| 2005/0271876 | A1 | 12/2005 | Walker et al. | JP | 8210402 A | 8/1996 |
| 2005/0281971 | A1 | 12/2005 | Lam et al. | JP | 09-176333 | 7/1997 |
| | | | | JP | 176667 A | 7/1997 |

| | | |
|---|---|---|
| JP | 9324824 A | 12/1997 |
| JP | 10110740 A | 4/1998 |
| JP | 2000-091186 | 3/2000 |
| JP | 20000336343 | 12/2000 |
| JP | 2002003280 A | 1/2002 |
| JP | 2002005317 A | 1/2002 |
| JP | 2002234951 A | 8/2002 |
| JP | 2003003155 | 1/2003 |
| JP | 2004132547 A | 4/2004 |
| JP | 2004217790 A | 8/2004 |
| JP | 2004266087 A | 9/2004 |
| WO | WO95/26473 | 10/1995 |
| WO | WO96/10701 A1 | 4/1996 |
| WO | WO 98/09093 | 3/1998 |
| WO | WO99/35415 A1 | 7/1999 |
| WO | WO2005/102962 A1 | 11/2005 |
| WO | WO2006/101799 A2 | 9/2006 |
| WO | WO2006/116474 A2 | 11/2006 |
| WO | WO2007/055951 A1 | 5/2007 |

OTHER PUBLICATIONS

Application No. EP01309199 Search Report, completed Feb. 15, 2002.
Application No. EP02257364 Search Report, completed Dec. 3, 2003.
Application No. EP03255504 Search Report, completed Dec. 4, 2003.
Application No. EP03256313 Search Report, completed Mar. 5, 2009.
Application No. EP04253746 Search Report, completed May 3, 2005.
Application No. EP04255582 Search Report, completed Jun. 15, 2007.
Application No. EP04255993 Search Report, completed Jun. 5, 2009.
Application No. EP05254284 Search Report, completed Nov. 2, 2005.
Application No. EP05254474 Search Report, completed Oct. 21, 2005.
Application No. EP06758609 Search Report, completed May 6, 2008.
Application No. EP08012805 Search Report, completed Oct. 14, 2008.
Application No. EP96306350 Search Report, completed Dec. 4, 1996.
Application No. PCT/US06/15769 International Search Report and Written Opinion, International Filing Date Apr. 25, 2006.
Application No. PCT/US06/42342 International Search Report and Written Opinion, International Filing Date Oct. 31, 2006.
Application No. PCT/US07/07788 International Search Report and Written Opinion, International Filing Date Mar. 28, 2007.
Application No. PCT/US2008/073266 International Search Report, International Filing Date Aug. 15, 2008.
Application No. PCT/US2008/080617 International Search Report, International Filing Date Oct. 21, 2008.
Application No. PCT/US97-15260 International Search Report, completed Nov. 20, 1997.
ASTM D638-08 Standard Test Method for Tensile Properties of Plastics, Copyright 1996-2009, pp. 1-4 ASTM International, West Conshohocken, PA, US.
Tensile Property Testing of Plastics; MatWeb: Material Property Data, www.matweb.com/reference/tensilestrength, 1996-2011.
Spiliadis, S., Garniture de freins a hautes performances contenant de la pulpe para-aramide Kevlar, 1141 Ingenieurs de L'Automobile, Dec. 1989, No. 653, Courbevoie, FR.
Garshin et al., Structural Features of a Carbon Plastic Material Infiltrated with Molten Silicon; Regractories and Industrial Ceramics, pp. 419-22, 2005.
Ma et al., Effect of Infiltrating Si on Friction Properties of C/C Composites; J. Cent. South Univ. Technol. vol. 10, No. 3, Sep. 2003, pp. 173-176.
Joseph, Marjory, Introductory Tensile Science, pp. 164, Holt, Rinehart and Wilson, Fifth Edition, Copyright 1986.
Zhaoting Liu et al., Synthesis of ZnFe2O4/SiO2 cmposites derived from a diatomite template, Bioinspiration & Biomimetics, 2 (2007) pp. 30-35.
Anderson et al., Hierarchical Pore Structures through Diatom Zeolitization, Angew. Chem. Int. Ed. 2000, vol. 39, No. 15, pp. 2707-2710.
Yajun Wang et al., Zeolitization of diatomite to prepare hierarchical porous zeolite materials through a vapor-phase transport . . . , j. Mater. Chem, 2002, vol. 12, pp. 812-1818.
Blanco et al., Chemical and Physical properties of carbon as related to brake performance, Elsevier, Wear 213 (1997) pp. 1-12.
Carbon Fiber for Wet-Friction Transmissions, SAE Technical, Off-Highway Engineering/Feb. 1998, pp. 46-48.
Hettinger, Jr. et al., Carboflex and Aerocarb-Ashland's New Low Cost Carbon Fiber and Carbonizing Products for Future Break Applications, 860767, Copyright 1986, pp. 1-11.
Gibson et al., Carbon/Carbon Friction Materials for Dry and Wet Brake and Clutch Applications, SAE Technical Paper Series, 890950, Copyright 1989, pp. 1-6.
Cardolite Brochure, Cardolite Corporation, www.cardolite.com, edition Jun. 2004.
What is a TPE?, GLS Corporation, www.glscorporation.com/resources/faqs.php, coypright 2007.
Lam et al., Friction Material for Continuous Slip Torque Converter Applications: Anti-Shudder Considerations, 941031, pp. 1-11, Aug. 20, 2007.
MPEP 1504.6 Double Patenting [R-5] -25—Design Patents, United States Patent and Trademark Office, USPTO.gov, Last Modified: Dec. 5, 2006.
U.S. Appl. No. 12/185,236; Friction Material With Silicon, Feng Dong, filed Aug. 4, 2008.
U.S. Appl. No. 12/084,514; Carbon Friction Materials, Feng Dong et al., filed May 1, 2008.
U.S. Appl. No. 11/410,722, Friction Material, Robert C. Lam, filed Apr. 25, 2006.
U.S. Appl. No. 12/225,014, Friction Materials Made With Resins Containing Polar Functional Groups, Timothy P. Newcomb, filed Sep. 10, 2008.
U.S. Appl. No. 10/678,720, Friction Material Containing Partially Carbonized Carbon Fibers, Robert C. Lam, filed Oct. 3, 2003.
U.S. Appl. No. 12/400,904, Frictional Device Comprising At Least One Friction Plate, Eckart Gold, filed Mar. 10, 2009.
U.S. Appl. No. 12/492,261, Friction Materials, Herschel L. McCord, filed Jun. 26, 2009.
U.S. Appl. No. 10/898,882, Porous Friction Material With Nanoparticles of Friction Modifying Material, Robert C. Lam, filed Jul. 26, 2004.
U.S. Appl. No. 10/678,598, Mixed Deposit Friction Material, Robert C. Lam, filed Oct. 3, 2003.
U.S. Appl. No. 10/678,599, High Performance, Durable, Deposit Friction Material, Robert C. Lam, filed Oct. 3, 2003.
U.S. Appl. No. 10/916,328, High Coefficient Woven Friction Material, Robert C. Lam, filed Aug. 11, 2004.
U.S. Appl. No. 12/157,901, Porous Friction Material Comprising Nanoparticles of Friction Modifying Material, Robert C. Lam, filed Jun. 12, 2008.

* cited by examiner

FULLY FIBROUS STRUCTURE FRICTION MATERIAL

BACKGROUND ART

New and advanced transmission systems and braking systems are being developed by the automotive industry. These new systems often involve high-energy requirements. Therefore, the friction materials technology must be also developed to meet the increasing energy requirements of these advanced systems.

In particular, new high performance, durable friction materials are needed. The new friction material must be able to withstand high speeds wherein surface speeds are up to about 65 m/seconds. Also, the friction material must be able to withstand high facing lining pressures up to about 1500 psi. It is also important that the friction material be useful under limited lubrication conditions.

The friction material must be durable and have high heat resistance in order to be useful in the advanced transmission and braking systems. Not only must the friction material remain stable at high temperatures, it must also be able to rapidly dissipate the high heat that is being generated during operating conditions.

In particular, friction materials that are used in shifting clutches and the like are subjected to the gradual breakdown of the fluid in which the friction material is being used. The as the fluid is used over a long period of time the fluid may degrade and particles of such fluid degradation form. These particles remain in the fluid, causing a loss of coefficient of friction for the friction material.

The high speeds generated during engagement and disengagement of the new transmission and braking systems mean that a friction material must be able to maintain a relatively constant friction throughout the engagement. It is important that the frictional engagement be relatively constant over a wide range of speeds and temperatures. It is also important that the friction material have a desired torque curve shape so that during frictional engagement the friction material is noise or "squawk" free.

The principal performance concerns for all applications using friction materials are "hot spot" resistance and the energy management at the friction interface. The occurrence of "hot spots" can be attributed to many factors including the friction characteristics of the friction material, the mating surface's hardness and roughness, oil film retention, lubricant chemistry and interactions, clutch operating conditions, driveline assembly and hardware alignment, and driveline contamination. The friction interface energy management is primarily concerned with controlling interface temperature and is affected by the pump capacity, oil flow path and control strategy. The friction material surface design also contributes to the efficiency of interface energy management.

Previously, asbestos fibers were included in the friction material for temperature stability. Due to health and environmental problems, asbestos is no longer being used. More recent friction materials have attempted to overcome the absence of the asbestos in the friction material by modifying impregnating materials with phenolic or phenolic-modified resins. These friction materials, however, do not rapidly dissipate the high heat generated, and do not have the necessary heat resistance and satisfactory high coefficient of friction performance now needed for use in the high speed systems currently being developed.

The present invention is an improvement over the Seitz U.S. Pat. No. 5,083,650 reference which involves a multi-step impregnating and curing process; i.e., a paper impregnated with a coating composition, carbon particles are placed on the paper, the coating composition in the paper is partially cured, a second coating composition is applied to the partially cured paper, and finally, both coating compositions are cured.

The Fujimaki et al. U.S. Pat. No. 4,451,590 describes a friction material having metallic fibers, filler, carbon particles, carbon fibers and phenolic resin.

The Smith et al. U.S. Pat. No. 5,965,658 describes a friction material using of carbonaceous fibers derived from oxidized polyacrylonitrile based fibers and powdered metal and/or metal oxide friction materials.

The Winkler U.S. Pat. No. 5,662,993 describes a friction material having fibers bound along points of contact by a binder material.

The Irifune et al. U.S. Pat. No. 6,121,168 describes a friction material with fibers and porous cylindrical diatomaceous earth.

The Suzuki et al. U.S. Pat. No. 6,586,673 B1 describes the use of disc-shaped diatomaceous earth as a filler in a fibrous base material.

The Suzuki et al. U.S. Pat. No. 6,265,066 B1 describes a friction material comprising a fibrous base, a filler, a friction adjuster and a binder that contains a material having a siloxane bond.

The Suzuki et al. U.S. Pat. No. 6,231,977 B1 describes a friction material comprising a fibrous base material, a filler, a friction controller and phenolic resin binder which is modified with p-nonyl phenol. The Matsumoto et al. U.S. Pat. No. 6,060,536 describes a method of making a friction material where a water soluble material is dispersed into a raw paper which includes a fibrous base material, a filler, and a friction adjusting agent.

The Klink U.S. Pat. No. 4,522,290 describes a friction lining comprising a resin-free wood with an average raw density in the dried condition of at least 550 kilograms per cubic meter where the fibers of the wood run substantially parallel to the frictional direction of the clutch or brake.

The Jacko et al. U.S. Pat. No. 4,239,666 describes an asbestos based material where lignin is added to reduce the need for phenolic resin.

The Seitz et al. U.S. Pat. No. 6,524,681 describes a patterned surface friction material.

The Kaminski et al. U.S. Pat. Nos. 5,889,082 and 5,919,837 describe a friction material comprising a blend of fibers and other friction material components.

The Bartram U.S. Pat. No. 4,197,223 and UK Patent No. 1,604,827 describe mixtures of inorganic and organic fibers such as glass fibers, mineral wools, alumna-silicate fibers, wood pulp, jute, sisal and cotton linters, along with fillers.

The Bortz U.S. Pat. No. 5,989,735 describes fibers carded or woven into a web.

The Ikuta U.S. Pat. No. 5,290,627 describes a friction material having wood pulp and ramie fibers and includes about 10 to about 30% filler.

The Chuluda U.S. Pat. No. 4,256,801 describes a friction material having cellulose, carbon fibers and flame resistant organic fibers (described as novoloid-crosslinked phenolic fibers).

The Royer U.S. Pat. No. 4,743,634 the use of cotton, jute, sisal, wool with friction modifying materials in a friction material.

The present invention is also distinct from patents owned by the assignee herein, BorgWarner Inc., for friction materials. In particular, U.S. Pat. No. 5,998,307 relates to a friction material having a base impregnated with a curable resin where a porous primarily layer comprises at least one fibrous material and a secondary layer of carbon particles covering at least about 3 to about 90% of the surface of the primary layer.

The U.S. Pat. No. 5,858,883 relates to a base material having a primary layer of less fibrillated aramid fibers, synthetic graphite, and a filler, and a secondary layer of carbon particles on the surface of the primary layer.

The U.S. Pat. No. 5,856,244 relates to a friction material comprising a base impregnated with a curable resin where the primary layer comprises less fibrillated aramid fibers, synthetic graphite and filler; and a secondary layer of carbon particles and a retention aid.

The U.S. Pat. No. 5,958,507 relates to a process for producing the friction material where at least one surface of the fibrous material, which comprises less fibrillated aramid fibers, is coated with carbon particles and a retention aid, impregnating with a phenolic or modified phenolic resin, and curing.

The U.S. Pat. No. 6,001,750 relates to a friction material comprising a fibrous base material impregnated with a curable resin where the fibrous base material has a porous primary layer of less fibrillated aramid fibers, carbon particles, carbon fibers, filler material, phenolic novoloid fibers, and optionally, cotton fibers, and a secondary layer of carbon particles which cover the surface at about 3 to about 90% of the surface.

In addition, various base materials are described in commonly owned BorgWarner Inc. U.S. Pat. Nos. 5,753,356 and 5,707,905 which describe base materials comprising less fibrillated aramid fibers, synthetic graphite and filler.

Another commonly owned patent, U.S. Pat. No. 6,130,176 relates to fibrous base materials comprising less fibrillated aramid fibers, carbon fibers, carbon particles and filler.

The U.S. Pat. No. 5,676,577 relates to a friction material having a high amount of filler material in a fibrous base material.

Yet another commonly owned patent, U.S. Pat. No. 6,630,416 relates to a friction material having a porous primary layer and a secondary layer of silica particles covering about 3 to about 90% of the surface of the primary layer.

In still other commonly owned patent applications, U.S. Ser. No. 09/233,318 filed Aug. 30, 2002, Ser. No. 09/234,976 filed Sep. 4, 2002, Ser. No. 09/218,019 filed Aug. 13, 2002, Ser. No. 10/666,090 filed Sep. 19, 2003, Ser. No. 10/678,720 filed Oct. 3, 2003, Ser. No. 10/678,598 filed Oct. 3, 2003, Ser. No. 10/678,725 filed Oct. 3, 2003, Ser. No. 10/678,728 filed Oct. 3, 2003 and Ser. No. 10/678,599, filed Oct. 3, 2003, all currently pending, describe other friction materials.

In order for friction materials to be useful in "wet" applications, the friction material must have a wide variety of acceptable characteristics. The friction material must be resilient or elastic yet resistant to compression set, abrasion and stress; have high heat resistance and be able to dissipate heat quickly; and, have long lasting, stable and consistent frictional performance. If any of these characteristics are not met, optimum performance of the friction material is not achieved.

It is also important that a suitable impregnating resin be used with the fibrous base material in order to form a high-energy application friction material. The friction material must have good shear strength both when saturated with the wet resin during impregnation and when saturated with brake fluid or transmission oil during use.

It is also important, under certain applications, that the friction material have high porosity such that there is a high fluid permeation capacity during use. Thus, it is important that the friction material not only be porous, it must also be compressible. The fluids permeated into the friction material must be capable of being squeezed or released from the friction material quickly under the pressures applied during operation of the brake or transmission, yet the friction material must not collapse. It is also important that the friction material have high thermal conductivity to also help rapidly dissipate the heat generated during operation of the brake or transmission.

The instant friction materials differ from those taught by the above references, particularly since, as far as is known, there is no disclosure of friction material for use in transmission systems which includes a fibrous base material that only contains fibrous material and no filler material. Further, as far as is known, there is no disclosure of a friction material consisting of a fibrous material having dispersed therein a permeating or penetrating of friction modifying particles. Further, until the present invention, there has been no disclosure of such a fiber content only fibrous base material having a permeating or penetrating gradient of friction modifying particles that comprise, for example, symmetrical shaped silica materials. These combinations of ingredients, as described in the embodiments herein, have been found to provide unexpectedly superior results with respect to hot spot resistance, coefficient of friction stability, and low thickness losses.

Accordingly, it is an object of the present invention to provide an improved friction material with reliable and improved properties compared to those of the prior art.

A further object of this invention is to provide friction materials with improved coefficient of friction characteristics, "compression modulus", "hot spot" resistance, high heat resistance, high friction stability and durability, porosity, strength, and elasticity.

As a result of extensive research and, in view of the need for a better friction material, a friction material with improved characteristics has been developed by the inventors herein. The present wet friction material is useful in "wet" applications where the friction material is "wetted" or impregnated with a liquid such as brake fluid or automatic transmission fluid during use. During use of the "wet" friction material, the fluid is ultimately squeezed from or is impregnating the friction material. Wet friction materials differ greatly, both in their compositions and physical characteristics from "dry" friction materials.

DISCLOSURE OF THE INVENTION

In order to achieve the requirements discussed above, many materials were evaluated for friction and heat resistant characteristics under conditions similar to those encountered during operation. Both commercially available brake linings and transmission materials were investigated and proved not to be suitable for use in high-energy applications.

The present invention relates to a non-asbestos, fibrous base material having dispersed therethrough, in a permeating or penetrating gradient, a desired amount of friction modifying particles.

Such a fiber only-content base material provides a friction material which is elastic and "soft", thereby producing a friction material with a very desirable compression modulus. The elasticity gives the friction material improved "hot spot" resistance and low lining loss.

The fibrous content only base material has a desired permeability due to relatively large pore sizes which aid in permeability and coefficient of friction stability.

The friction material of the present invention also has improved "hot spot" resistance, desirable friction characteristics for "smooth shifts", high heat resistance durability, improved strength, and porosity.

According to one aspect of the invention, the fibrous base material defines pore diameters ranging in mean average size from about 20 to about 50 microns and has readily available air voids of at least about 50%.

In certain embodiments, the fully fibrous base material consists of least one type of aramid fibers, carbon fibers and cellulose fibers. The aramid fibers preferably have a freeness of about 350 or less on the Canadian Standard Freeness index and have average fiber lengths in the range of about 0.5 to about 10 mm.

In particular embodiments, the fibrous base material includes flat and smaller diameter fibers which provide the friction material with a smooth and uniform surface. In certain preferred aspects, the cellulose fibers comprising wood fibers that have flat and wide fiber surfaces. In certain embodiments, flat wood fibers from trees having desired resinous exudation such as birch, eucalyptus and rubber/gum trees are especially useful.

In certain specific embodiments, the fibrous base layer comprises about 60 to about 75%, by weight, aramid fibers; about 10 to about 15%, by weight, cotton fibers; about 5 to about 15%, by weight, carbon fibers; about 10 to about 20%, by weight, cellulose fibers, based on the weight of the fibrous base material.

The fully fibrous base material is more open, or less dense, than other fibrous base materials that contain filler material. In certain embodiments, the fully fibrous base material has a basis weight in the range of about 120 to about 125, as compared to conventional base materials whose basis weight typically range from about 150 to about 165.

In another aspect, the present invention relates to a friction material comprising a fully fibrous base material having dispersed therethrough, in a penetrating gradient, a desired amount of friction modifying particles. The friction modifying materials are dispersed within the fully fibrous base material leaving many open pores in the base material. The friction modifying particles are solid, insoluble particles that remain dispersed within the fully fibrous base material. There is a higher concentration of the friction modifying particles at, or near, a top surface of the fully fibrous base material. The concentration of friction modifying particles in the fully fibrous base material progressively decreases from the top surface towards a bottom surface of the base material. In certain embodiments, the friction material comprises about 0.2% to about 20%, by weight, of friction modifying particles, based on the weight of the fibrous base material.

In certain embodiments, the frictions modifying material comprises silica particles and are present at about 5 to about 15%, by weight, based on the weight of the fibrous base material. In certain preferred aspects, the friction modifying particles are present to a depth of about 150 μm in the fully fibrous base material as measured from a top surface of the fully fibrous base material. The friction modifying particles have an average size ranging from about 5 to about 100 microns.

In other embodiments, the friction modifying materials comprise about 20% to about 35%, by weight, of silica particles, and about 65% to about 80% carbon particles, based on the total weight of the friction modifying particles. In still other embodiments, the friction modifying particles comprise a mixture of i) diatomaceous earth particles and ii) fully carbonized carbon particles or partially carbonized particles, and mixtures thereof.

In certain specific embodiments, the fibrous base layer comprises about 60 to about 75%, by weight, aramid fibers; about 10 to about 15%, by weight, cotton fibers; about 5-15%, by weight, carbon fibers; about 10 to about 20%, by weight, cellulose fibers; and, about 5 to about 20 lbs/3000 sq.ft., by weight, friction modifying particles, based on the weight of the fibrous base material. In certain embodiments, the friction modifying particles are present at about 8 to about 10 lbs/3000 sq.ft.

Various friction modifying particles are useful in the fibrous base material. In particular, silica particles such as diatomaceous earth, celite, celatom, and/or silicon dioxide are especially useful. The friction modifying particles are present at about 0.2 to about 30%, by weight, and preferably about 2-10%, by weight, and most preferably about 3-5%, by weight, of the fibrous base material.

Another aspect of the present invention is a friction material having a fully fibrous base material and having dispersed therethrough a desired amount of friction modifying particles that have symmetrical shapes, such as, for example, diatomaceous earth.

In still another aspect, the present invention relates to a process for producing a friction material comprising: forming a fully fibrous base material, permeating the fibrous base material with friction modifying particles and forming a gradient of friction modifying particles dispersed within the fibrous base material, the friction modifying particles being present at about 0.2 to about 20%, by weight, based on the weight of the fibrous base material, and impregnating the "friction-modifying material-permeated-fully fibrous" base material with a suitable resin, and thereafter curing the impregnated fibrous base material at a predetermined temperature for a predetermined period of time.

Thus, in certain aspects the present invention relates to a friction material comprising a fibrous base material impregnated with at least one curable resin where the fibrous base material comprises a fully fibrous base material having friction modifying particles dispersed within the base material.

The fibrous base material can be impregnated using different resin systems. In certain embodiments, it is useful to impregnate the fibrous based material with a phenolic resin or a modified phenolic-based resin. In certain embodiments, when a silicone resin is blended or mixed with a phenolic resin in compatible solvents and that silicone-phenolic resin blend is used to impregnate a fibrous base material of the present invention, an especially useful high performance, durable friction material is formed.

BEST MODE OF CARRYING OUT THE INVENTION

The friction material of the present invention has improved compression modulus and improved "hot spot" resistance. Also, the friction material has improved elasticity and improved porosity which allow for more uniform heat dissipation during use of the friction material. The fluid in the transmission or brake can rapidly move through the porous structure of the friction material. Further, the increased elasticity provides more uniform pressure and even pressure distribution on the friction material such that uneven lining wear and separator plate "hot spots" are eliminated.

The more porous the structure of the friction material, the more efficient is the heat dissipation. The oil flow in and out of the friction material during engagement of the friction material during use occurs more rapidly when the friction material is porous.

Figure 1:
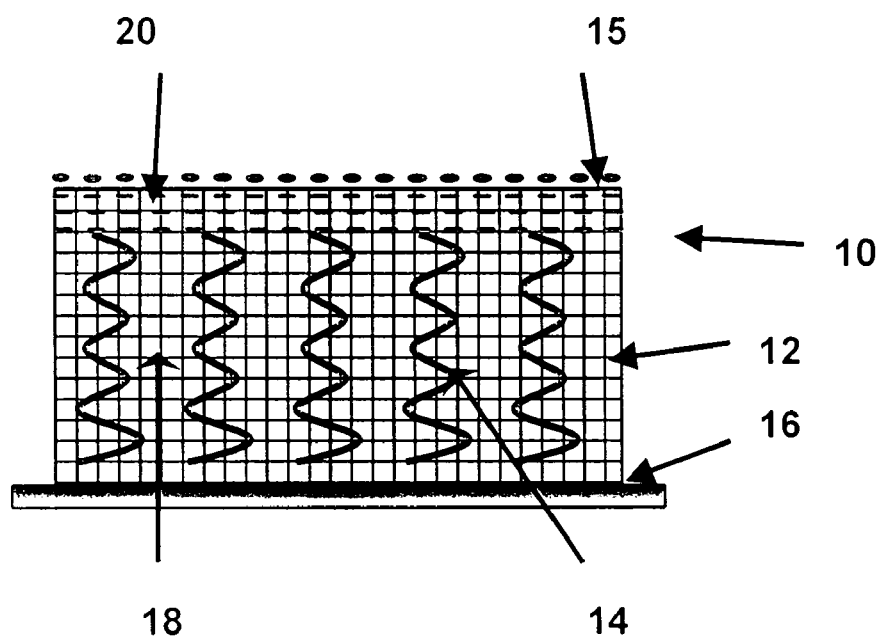
FIG. 1 is a schematic illustration of a fully fibrous base material.

The fully fibrous base material 10 is schematically shown in FIG. 1 as including refined fibers 12 which form an elastic structure, or network, 14. The fully fibrous base material has a top surface 15 and a bottom surface 16. The elastic structure 14 defines large and uniform size pores 18.

In one embodiment, the fully fibrous base material 10 includes a plurality of friction modifying materials 20 dispersed within the fibrous network 14. The friction modifying particles 20 are dispersed within the elastic network 14 in a permeating or penetrating gradient such that there is a higher concentration of friction modifying particles near the top surface 15 of the fully fibrous network 14. The gradient of friction modifying particles 20 extends through the fully fibrous network 14 whereby there is a lesser concentration of friction modifying particles 20 near the bottom surface 16 of the fully fibrous network 14.

The fully fibrous base material 10 is impregnated with a suitable resin to form a friction material which has a desired elasticity (Modulus). The more elastic (lower modulus) friction material results in less thickness losses during use. During use, the friction material is under compressive stresses and the elastic network of the fully fibrous base material resists permanent deformation.

Also, the friction material has a desired permeability. The highly permeable fully fibrous base material is more elastic and allows for better fluid flow through the friction material.

The friction material has surprisingly prolonged hydrodynamic characteristics, which, in turn, maintain a desired high coefficient of friction (COF) level up to at least the midpoint COF. Further, the friction material has desired large pores which provide better heat dissipation by allowing better fluid flow through the friction material. The friction material has a surprising surface smoothness which provides better contact between the friction material and the mating surface which it engages. In certain embodiments, the fully fibrous base material also provides the friction material with a controlled surface profile due to the presence of refined fibers comprising the fully fibrous base material.

In addition the friction material has more active friction contact sites which provides the friction material with higher asperity torque. That is, there is a larger area of contact available due to the presence of the refined fibers. In certain embodiments, there are more contact sites available due to the type of friction modifying particles present within and on the fully fibrous base material In certain aspects, the fully fibrous base material comprises fibrillated aramid fibers, cellulose-based fibers, and carbon fibers. The fibrillated aramid fibers in the fully fibrous base material provide a desirable pore structure to the friction material which, in turn, provides increased thermal resistance to the friction material.

Fibrillated aramid fibers generally have many fibrils attached to a core fiber. The use of the fibrillated aramid fibers provides a friction material having a more porous structure; i.e., there are more and larger pores in the base material. The porous structure is generally defined by the pore size and liquid permeability. In a preferred embodiment, the fully fibrous base material defines pores ranging in mean average size from about 2.0 to about 100 microns in diameter. In certain embodiments, the mean pore size ranges from about 10 to about 50 microns in diameter and the friction material had readily available air voids of at least about 50% and, in certain embodiments, at least about 60% or higher.

When the friction material has a higher mean flow pore diameter and permeability, the friction material is more likely to run cooler or with less heat generated in a transmission due to better automatic transmission fluid flow throughout the porous structure of the friction material. During operation of a transmission system, oil deposits on the surface of the friction material tend to develop over time due to a breakdown of the automatic transmission fluid, especially at high temperatures. The oil deposits on the fibers decrease the pore openings. Therefore, when the friction material initially starts with larger pores, there are more open pores remaining during the useful life of the friction material. In addition, in embodiments at least partially impregnated with a silicone resin, the silicone resin, due its elastic characteristics, allows the fibers in the friction material to have an even more open structure.

Also, in certain embodiments, it is desired that the aramid fibers have a length ranging from about 0.5 to about 10 mm and a Canadian Standard Freeness (CSF) of about 250 to about 300. Thus, in certain embodiments, the aramid fibers can have a freeness such as aramid pulp, have a freeness of about 285-290. The "Canadian Standard Freeness" (T227 om-85) means that the degree of fibrillation of fibers can be described as the measurement of freeness of the fibers. The CSF test is an empirical procedure which gives an arbitrary measure of the rate at which a suspension of three grams of fibers in one liter of water may be drained. Therefore, the less fibrillated aramid fibers have higher freeness or higher rate of drainage of fluid from the friction material than other aramid fibers or pulp In certain embodiments, the presence of the carbon fibers in the fully fibrous base material aids in increasing the thermal resistance, maintaining a steady coefficient of friction and increasing the squeal resistance. Carbon fibers used in the fibrous base material provide good heat conduction such that the friction material has a desired heat resistance. In particular embodiments, the fibrous base material has from about 5 to about 20%, and in certain embodiments, about 10 to about 15%, by weight, carbon fibers. In other particular embodiments, the use of fibrillated aramid fibers and carbon fibers in a fibrous base material improves the friction material's ability to withstand high temperatures.

The cellulose-based fibers provide a smooth surface to the friction material, thereby making the friction material more stable during operation. In certain embodiments the cellulose fibers comprise fibers that have a flat and wide surface. The flat, wide cellulose fibers retain more friction modifying particles on the surface of the individual fibers making up the base material. In certain specific embodiments, it is desired to use cellulose fibers that are derived from wood. In particular embodiments, the fully fibrous base material includes wood-based cellulose fibers such as birch fibers and/or eucalyptus fibers. The wood-based cellulose fibers also improve the friction material's clutch "break-in" characteristics at an economical cost.

Figure 2:
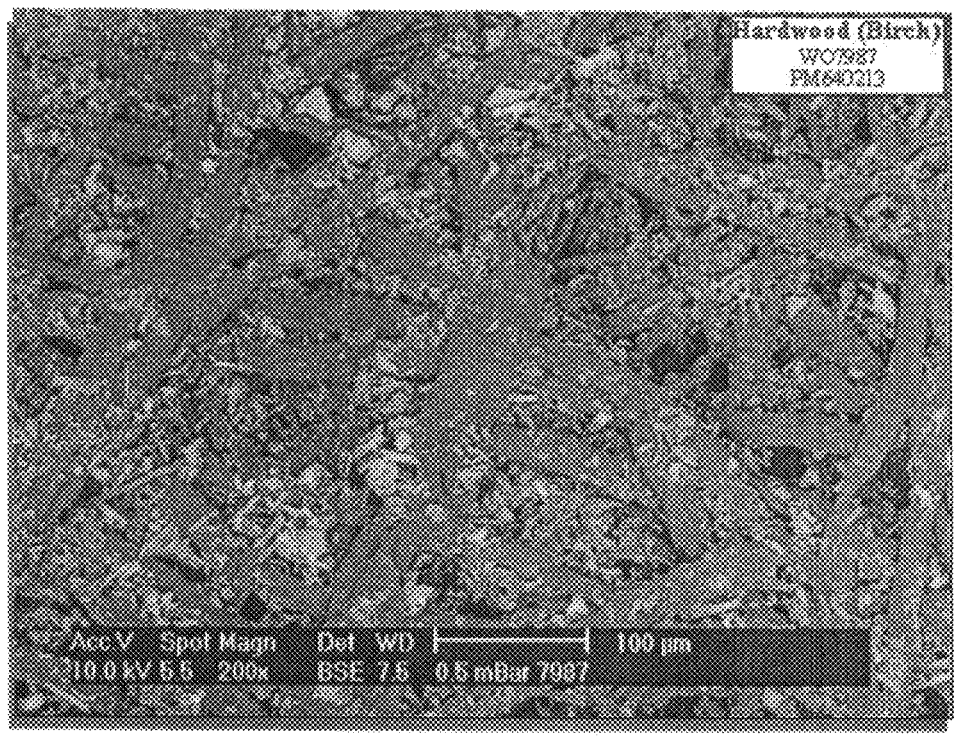
FIG. 2 is a scanning electron microphotograph (SEM) showing fiber surface morphology of wood fibers.
Figure 3:
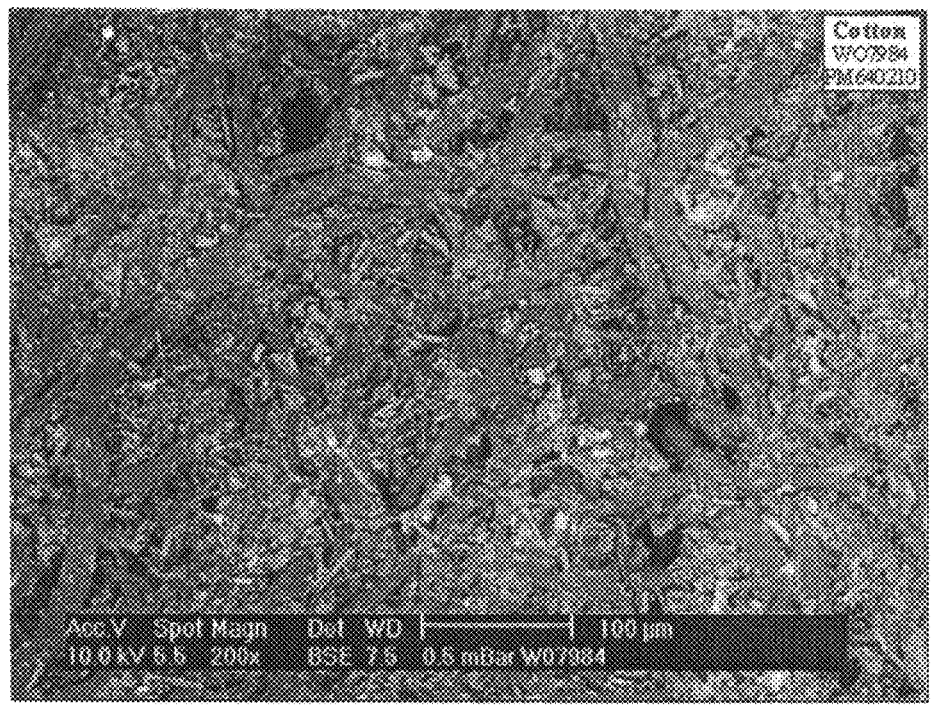
FIG. 3 is an SEM showing fiber surface morphology of cotton fibers.

In certain embodiments, the presence of cotton fibers in the fully fibrous base material aids in providing shear strength to the friction material. The cotton fibers have fibrillated strands attached to a main fiber core and aid in preventing delamination of the friction material during use FIGS. 2 and 3 compare the fiber surface morphology of different cellulose fibers; FIG. 2 shows and SEM of birch fibers, while FIG. 3 shows an SEM of cotton fibers. In certain embodiments, about 10 to about 15%, and, in certain embodiments, about 12 to about 13% wood-based cellulose fibers are included in the fully fibrous base material.

Figure 5:
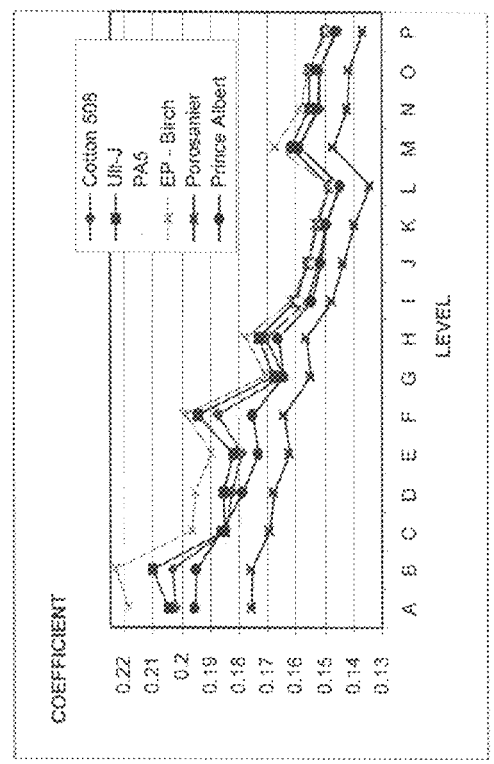
FIG. 5 is a model prediction showing the midpoint coefficient of friction for various materials.
Figure 4:
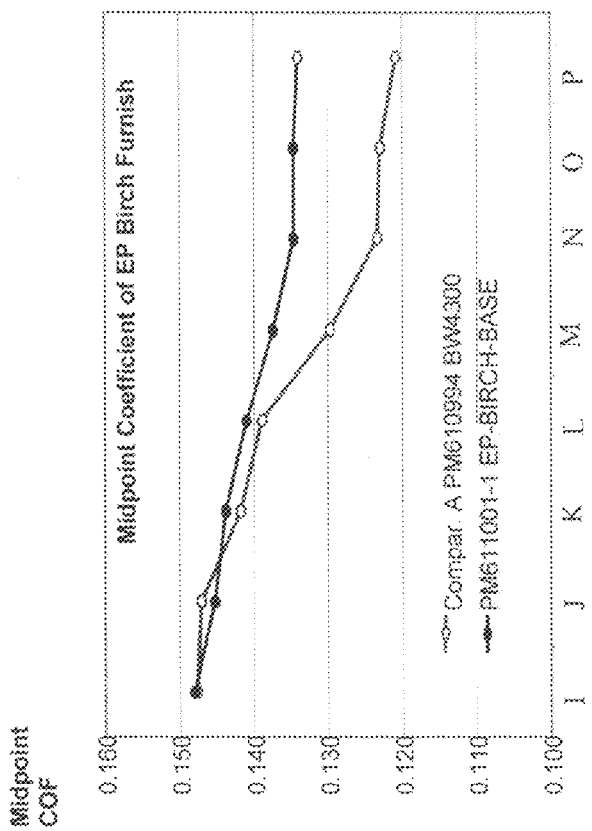
FIG. 4 is a graph showing the midpoint coefficient of friction data for a Compar. A material as compared to a fully fibrous base material that includes wood fibers in the base material.

FIG. 4 shows a graph of the midpoint coefficient of friction data for a Compar. A material as compared to a fully fibrous base material that includes wood cellulose fibers in the fully fibrous base material. FIG. 5 is a model prediction showing the midpoint coefficient of friction for various materials.

In other embodiments, another type of cellulose fiber such as cotton fiber is added to the fully fibrous base material of the present invention to give the fibrous material higher coefficients of friction. In certain embodiments, about 10 to about 15%, and, in certain embodiments, about 12 to about 13% cotton can also be added to the fibrous base material.

Optionally, at least one type of latex type material can be included in the fibrous base material. In particular embodiments, the fibrous base material can have from about 0 to about 3%, and in certain embodiments, about 2%, by weight, latex type material.

In particular embodiments, the fibrous base material has from about 50 to about 75%, and in certain embodiments about 65 to about 70%, by weight, aramid fibers, when combined with about 25 to about 50%, and in certain embodiments about 20 to about 30%, by wt., cellulose type fibers.

In other particular embodiments, the fibrous base material has from about 50 to about 75%, and in certain embodiments about 65 to about 70%, by wt., 25 to about 50%, and in certain embodiments about 20 to about 30%, by wt., cellulose type fibers, and about 0 to about 15%, and in certain embodiments about 5 to about 10%, by wt., carbon fibers.

According to another aspect of the present invention, friction modifying particles are dispersed in a fully fibrous base material. The friction modifying particles are dispersed within a permeating or penetrating gradient that extends from a top surface of the fully fibrous base material towards a bottom surface of the fully fibrous base material. In certain embodiments, the friction modifying particles are dispersed to a depth of at least about 150 μm within the fully fibrous base material. The friction modifying particles within the fibrous base material provides high heat resistant and highly durable fibrous base material.

For example, silica particles such as diatomaceous earth, Celite®, Celatom®, and/or silicon dioxide are especially useful. The silica particles are inexpensive organic materials which bond strongly to the fibrous materials. The silica particles provide high coefficients of friction to the friction material. The silica particles also provide the friction material with a smooth friction surface and provides a good "shift feel" and friction characteristics to the friction material such that any "shudder" is minimized.

In certain embodiments, the friction modifying particles can comprise symmetrical shaped particles. In one aspect of the present invention, the friction modifying materials of the regular geometry comprise a round, flat disks of celite. When dispersed in a penetrating gradient within the fully fibrous base material, the friction modifying particles having a regular geometry, such as round, flat disks, provide a unique surface stacking pattern and the three-dimensional structure to the base material which, in turn, improves oil retention and oil flow in the friction material.

The symmetrically geometric shaped friction modifying particles act to hold a quantity of lubricant within the friction material and to create channels of oil flow within the friction material due to the micro hard solid regular mountain-valley type surface topography of the stacking layers of symmetrically shaped friction modifying particles. In certain embodiments, celite is useful as a friction modifying material since celite typically has a symmetrical shape. In use, a thin layer of oil or fluid is formed on the individual geometrically shaped friction modifying particles. This thin layer keeps the oil flow film on the friction modifying particle, thus increasing the oil retaining capacity of the friction material. This provides good coefficient of friction characteristics and good slip durability characteristics.

In preferred embodiments, the amount of friction modifying particles dispersed within the fully fibrous base material ranges from about 0.2 to about 20%, by weight, and in certain embodiments about 2 to about to about 15%, by weight, and in certain preferred embodiments about 2 to about 5%, by weight, of the friction paper.

A preferred process for producing the friction material comprises mixing the ingredients forming the fully fibrous base material. The fully fibrous base material with the friction modifying particles dispersed therein is then impregnated with at least one phenolic or phenolic-based resin. The impregnated, fully fibrous base material is cured at a predetermined temperature for a predetermined period of time to form the friction material.

Various methods for impregnating the fully fibrous base materials of the present invention can be used. The fully fibrous base material is impregnated with the phenolic or phenolic based resin, preferably so that the impregnating resin material comprises about 45 to about 65 parts, by weight, per 100 parts, by weight, of the friction material. After the fully fibrous base material has been impregnated with the resin, the impregnated fully fibrous base material is heated to a desired temperature for a predetermined length of time to form the friction material. The heating cures the phenolic resin at a temperature of about 300° F. When other resins are present, such as a silicone resin, the heating cures the silicone resin at a temperature of about 400° F. Thereafter, the impregnated and cured friction material is adhered to the desired substrate by suitable means.

In certain embodiments, it is preferred that the target pick up of resin by the fully fibrous base material range from about 35 to about 65%, and, in certain embodiments, about 60 to at least 65%, by weight, total silicone-phenolic resin. After the fully fibrous base material is impregnated with the resin, the fully fibrous base material is cured for a period of time (in certain embodiments for about ½ hour) at temperatures ranging between 300-400° C. to cure the resin binder and form the friction material. The final thickness of the friction material depends on the initial thickness of the fully fibrous base material and, in certain embodiments, preferably ranges from about 0.014" to about 0.040".

It further contemplated that other ingredients and processing aids known to be useful in both preparing resin blends and in preparing impregnating fibrous-based materials can be included in the friction materials.

Various resins useful in impregnating the fully fibrous base material include phenolic resins and phenolic-based resins. It is to be understood that various phenolic-based resins which include in the resin blend other modifying ingredients, such as epoxy, butadiene, silicone, tung oil, benzene, cashew nut oil and the like, are contemplated as being useful with the present invention. In the phenolic-modified resins, the phenolic resin is generally present at about 50% or greater by weight (excluding any solvents present) of the resin blend. However, it has been found that friction materials, in certain embodiments, can be improved when the impregnant resin blend contains about 5 to about 80%, by weight, and for certain purposes, about 15 to about 55%, and in certain embodiments about 15 to about 25%, by weight, of silicone resin based on the weight of the silicone-phenolic mixture (excluding solvents and other processing acids).

Examples of useful phenolic and phenolic-silicone resins useful in the present invention are disclosed in the above-referenced BorgWarner U.S. patents which are fully incorporated herein, by reference. Silicone resins useful in the present invention include, for example, thermal curing silicone sealants and silicone rubbers. Various silicone resins are useful with the present invention. One resin, in particular, comprises xylene and acetylacetone (2,4-pentanedione). The silicone resin has a boiling point of about 362° F. (183° C.), vapor pressure at 68° F. mm, Hg: 21, vapor density (air=1) of 4.8, negligible solubility in water, specific gravity of about 1.09, percent volatile, by weight, 5% evaporation rate (ether=1), less than 0.1, flash point about 149° F. (65° C.) using the Pensky-Martens method. It is to be understood that other silicone resins can be utilized with the present invention. Other useful resin blends include, for example, a suitable phenolic resin comprises (% by wt.): about 55 to about 60% phenolic resin; about 20 to about 25% ethyl alcohol; about 10 to about 14% phenol; about 3 to about 4% methyl alcohol; about 0.3 to about 0.8% formaldehyde; and, about 10 to about 20% water. Another suitable phenolic-based resin comprises (% by wt.): about 50 to about 55% phenol/formaldehyde resin; about 0.5% formaldehyde; about 11% phenol; about 30 to about 35% isopropanol; and, about 1 to about 5% water.

It has also been found that another useful resin is an epoxy modified phenolic resin which contains about 5 to about 25 percent, by weight, and preferably about 10 to about 15 percent, by weight, of an epoxy compound with the remainder (excluding solvents and other processing aids) phenolic resin. The epoxy-phenolic resin compound provides, in certain embodiments, higher heat resistance to the friction material than the phenolic resin alone.

Both the silicone resin and the phenolic resin are present in solvents which are compatible to each other. These resins are mixed together (in preferred embodiments) to form a homogeneous blend and then used to impregnate a fibrous base material. There is not the same effect if a fibrous base material is impregnated with a phenolic resin and then a silicone resin is added thereafter or vice versa. There is also a difference between a mixture of a silicone-phenolic resin solution, and emulsions of silicone resin powder and/or phenolic resin powder. When silicone resins and phenolic resins are in solution they are not cured at all. In contrast, the powder particles of silicone resins and phenolic resins are partially cured. The partial cure of the silicone resins and the phenolic resins inhibits a good impregnation of the fibrous base material.

In certain embodiments of the present invention, the fibrous base material is impregnated with a blend of a silicone resin in a solvent which is compatible with the phenolic resin and its solvent. In one embodiment, isopropanol has been found to be an especially suitable solvent. It is to be understood, however, that various other suitable solvents, such as ethanol, methyl-ethyl ketone, butanol, isopropanol, toluene and the like, can be utilized in the practice of this invention. The presence of a silicone resin, when blended with a phenolic resin and used to impregnate a fibrous base material, causes the resulting friction materials to be more elastic than fibrous base materials impregnated only with a phenolic resin. When pressures are applied to the silicone-phenolic resin blended impregnated friction material of the present invention, there is a more even distribution of pressure which, in turn, reduces the likelihood of uneven lining wear. After the silicone resin and phenolic resin are mixed together, the mixture is used to impregnate a fibrous base material.

EXAMPLES

The friction materials of the present invention are especially suited for shifting clutch applications that have special requirements. These requirements include high coefficient of friction characteristics, hot spot resistance, good smoothness and permeability characteristics as shown by good torque curves and good Mp-v curves, low lining loss as shown by low compression set and high strength, and large pore sizes within the fully fibrous base material for better permeability as shown by coefficient of friction stability.

Figure 6:
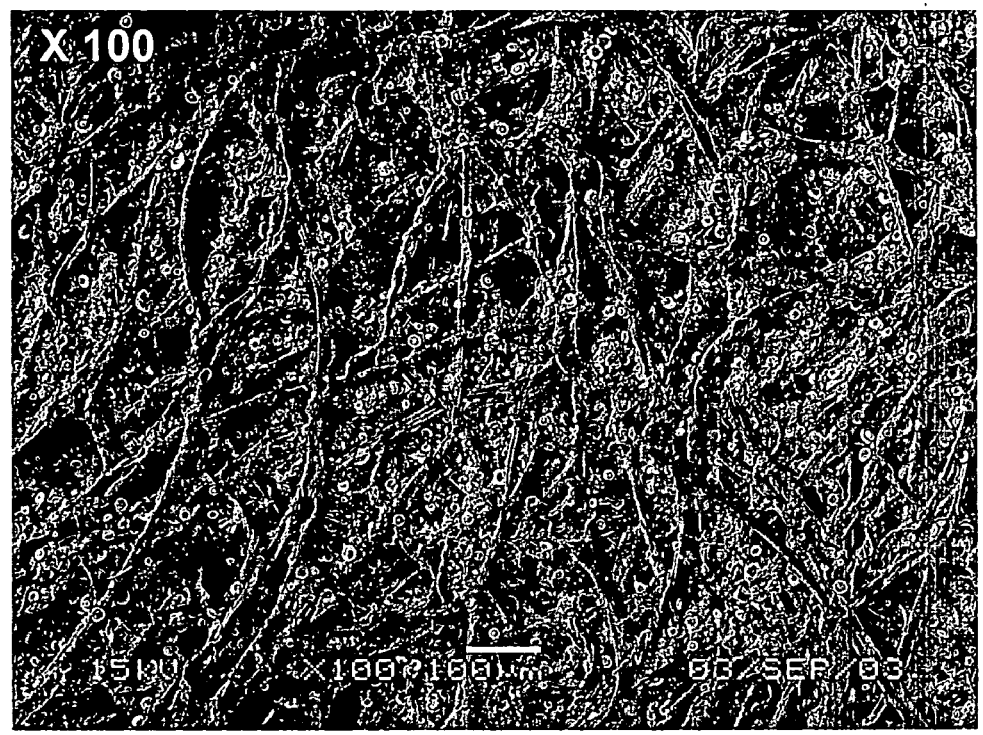
FIGS. 6 and 7 are SEMs (at ×100 and ×500, respectively) of one example, Example 1, of the present invention showing a top surface (felt side) of a fully fibrous base friction material having a permeating or penetrating gradient of friction modifying particles that have substantially dispersed therein in a penetrating gradient.
Figure 7:
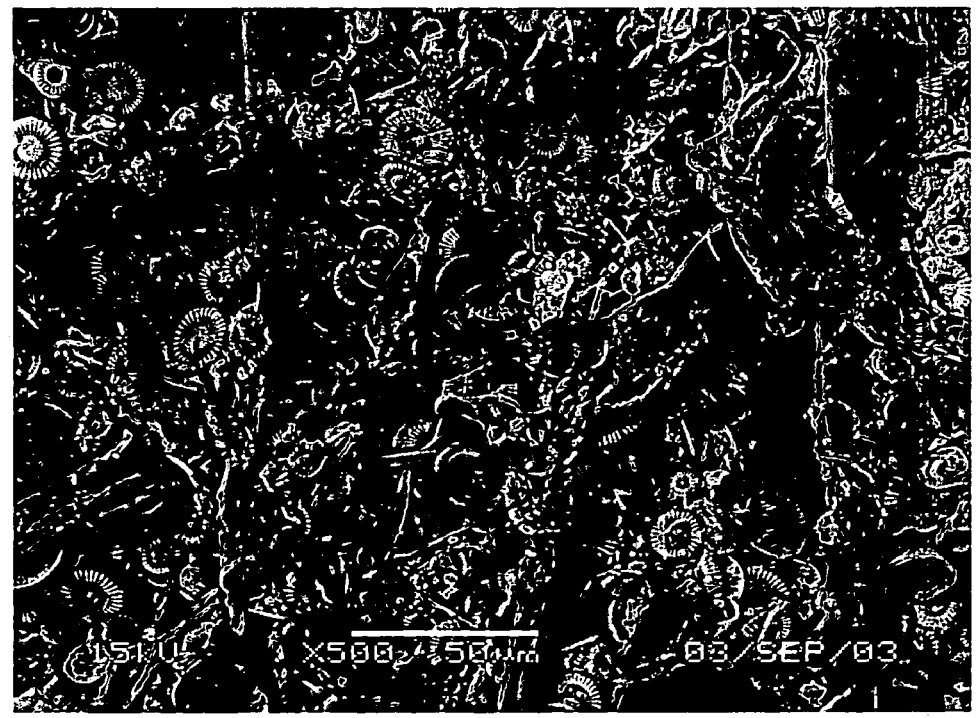

FIGS. 6 and 7 are SEMs (at ×11 and ×500) of one example, Example 1, of the present invention showing a top surface (felt side) of a fully fibrous base friction material having a permeating or penetrating gradient of friction modifying particles that have substantially dispersed therein. The FIGS. 6 and 7 show that the top surface is partially covered such that open channels are maintained in the fully fibrous base material.

Figure 8:
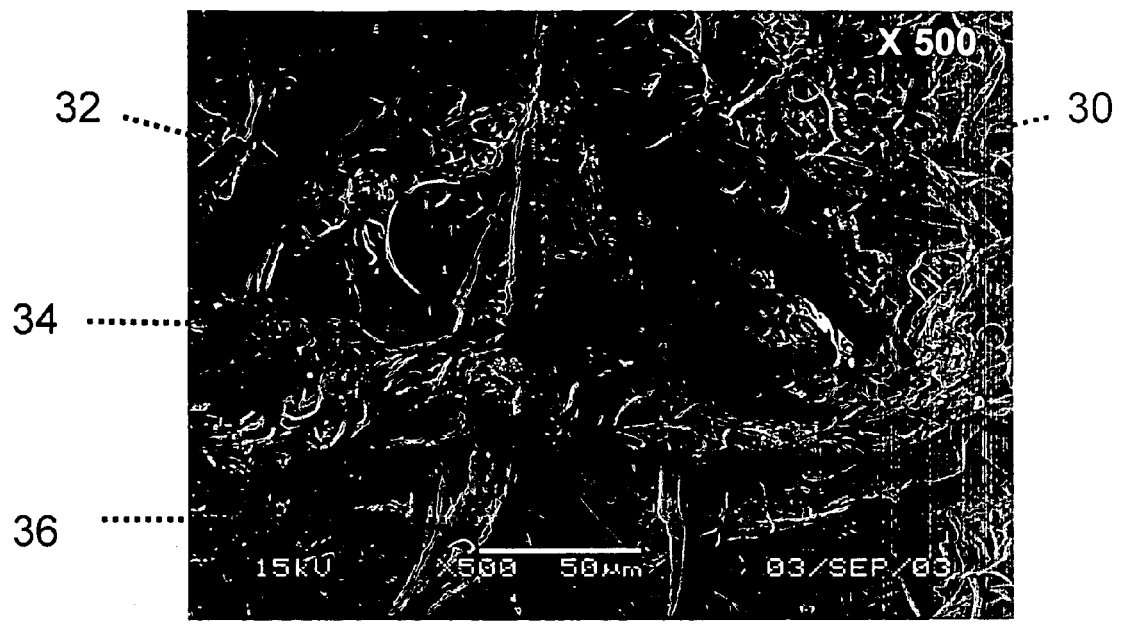
FIG. 8 is an SEM (at ×500) showing a bottom surface (wire side) of the Example 1 showing the absence of any friction modifying particles.

FIG. 8 is an SEM at ×500 showing a bottom surface (wire side) of the Example 1 which shows fibrillated aramid fibers 30, carbon fibers 32, cotton fibers 34, and wood-based cellulose fibers 36. There is no presence of any friction modifying particles on the bottom surface.

Figure 9:
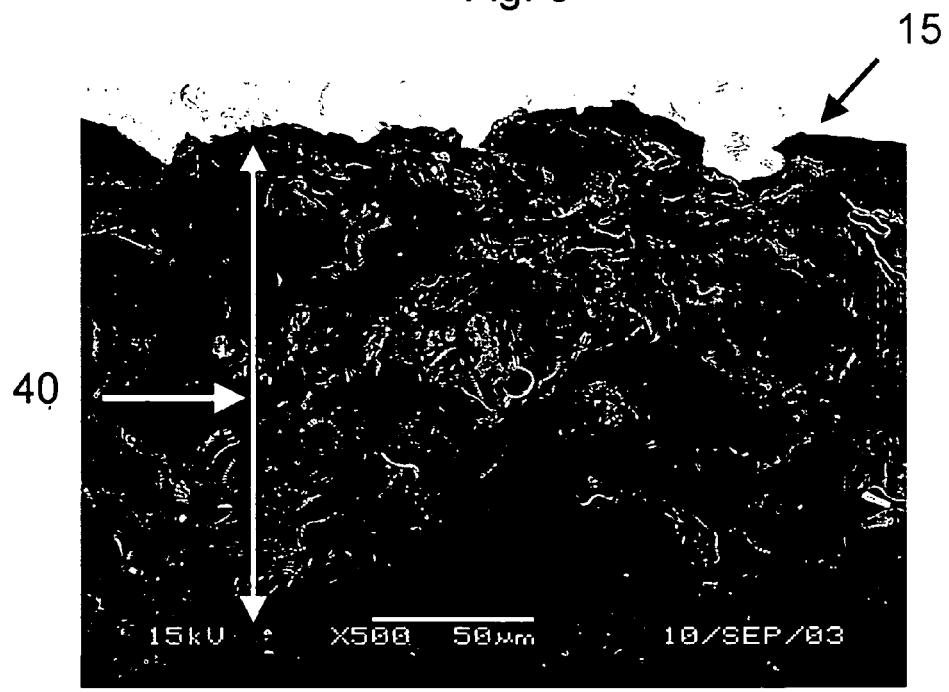
FIG. 9 is a cross-sectional view of Example 1 showing a diffusion (permeating) gradient of friction modifying particles, to a depth of about 150 μm.

FIG. 9 is a cross-sectional view of Example 1 showing the top surface 15, the bottom surface 16, and as diffusion (permeating) gradient of friction modifying particles, as indicated by arrow 40, to a depth of about 150 µm. The diffusion of friction modifying particles from the top surface 14 to the bottom surface 16 provides the friction material with better cohesion of the friction modifying particles within the fully fibrous base material.

The following examples provide further evidence that i) the fully fibrous base material and ii) the fully fibrous base material having a permeating or penetrating gradient of friction modifying particles dispersed therein, and the resulting friction materials formed using such base material, are an improvement over conventional friction materials. Various preferred embodiments of the invention are described in the following examples, which however, are not intended to limit the scope of the invention.

Example I

Table 1 shows the formulations for an Example 1 of the present invention and Comparative examples A, B and C.

TABLE I

| Material Furnish % | Ex. 1 | One Embodiment of Ex. 1 | Compar. A | Compar. B | Compar. C |
| --- | --- | --- | --- | --- | --- |
| Aramid fiber - fibrillated | 60–70 | 66 | 20–25 23 | | |
| Aramid fiber - less fibrillated CSF 625 | | | | 30–40 35 | 40–50 45 |
| Carbon fiber | 5–15 | 9 | | | |
| Cotton fiber | 10–15 | 12.5 | 25–35 31 | 20–30 25 | 15–25 20 |
| Graphite | | | 20–25 21.5 | 15–25 20 | 15–25 20 |
| Silica-celite 388 | | | 20–30 24.5 | | |
| Silica-symmetrical shaped | | | | 15–25 20 | |
| Cellulose | 10–15 | Wood-eucalyptus 12.5 | | | |
| Friction Modifying Particles | 9 lbs dispersed within | 9 lbs dispersed within | | | 9 lbs as a top coating layer |
| Basis Weight | 123 + 9 lbs | 123 + 9 lbs | 154 | 154 | 154 + 9 lbs |

Example II

Figure 10:
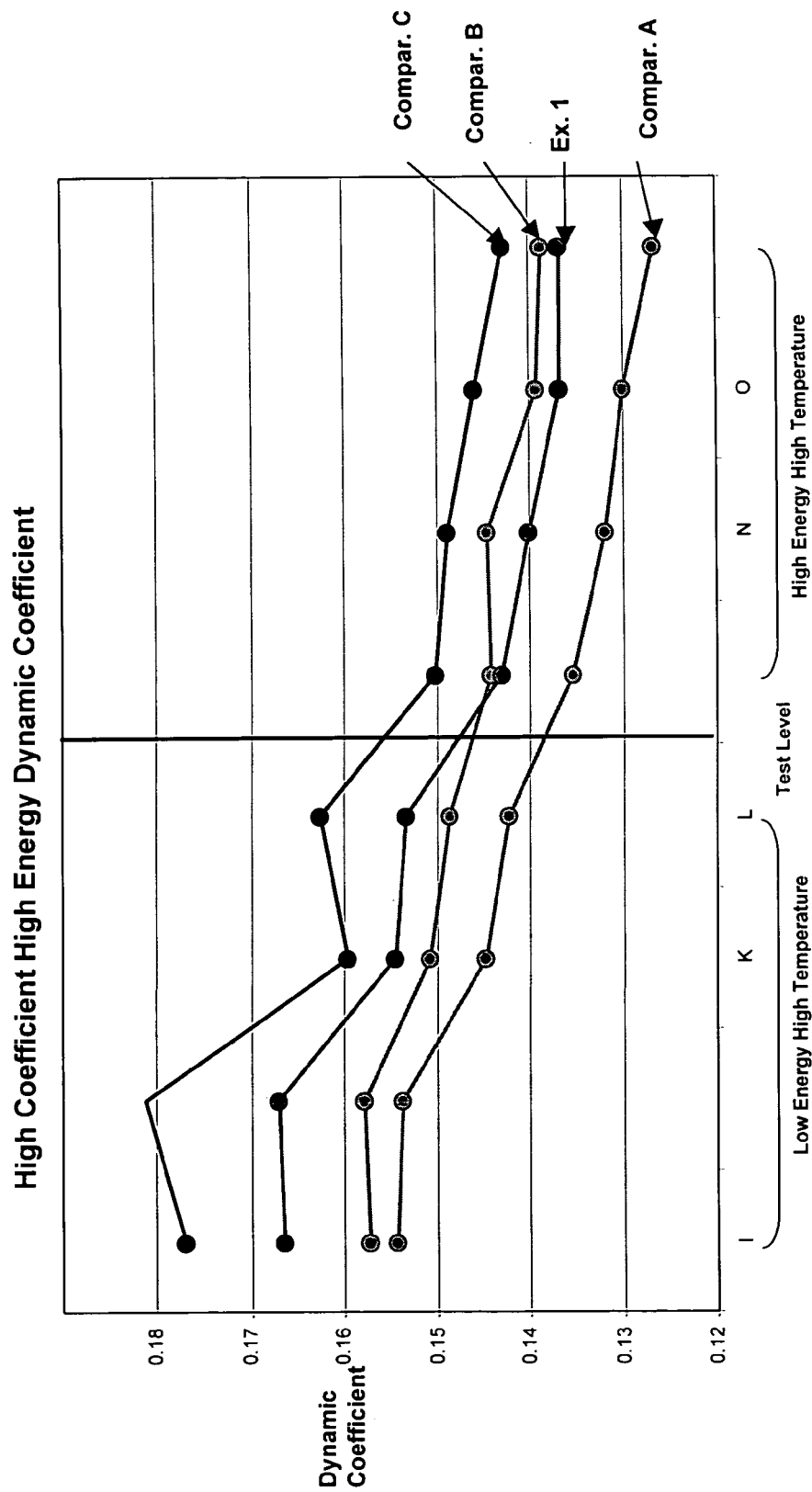
FIG. 10 is a graph showing the correlation between the test levels for "Low Energy/High Temperature" and "High Energy/High Temperature" as compared to the dynamic coefficients of friction for Example 1, Compar. A, Compar. B., and Compar. C.

The correlation between the test levels for "Low Energy/High Temperature" and "High Energy/High Temperature" as compared to the dynamic coefficients of friction for Example 1, Compar. A, Compar. B., and Compar. C. is shown in FIG. 10. The Tables 2a and 2b below show the material properties of modulus, permeability, roughness and COF for the low energy region (Table 2a-levels I-L) and the high energy regions (Table 2b-levels M-P), where 1 is lowest and 4 is highest.

TABLE 2a

| Low Energy Region | Modulus | Permeability | Roughness | COF |
| --- | --- | --- | --- | --- |
| Compar. C | 1 | 2 | 1 | 4 |
| Example 1 | 2 | 3 | 4 | 3 |
| Compar. B | 4 | 4 | 2 | 2 |
| Compar. A | 3 | 1 | 3 | 1 |

TABLE 2b

| High Energy Region | Modulus | Permeability | Roughness | COF |
| --- | --- | --- | --- | --- |
| Compar. C | 1 | 2 | 1 | 4 |
| Example 1 | 2 | 3 | 4 | 2 |
| Compar. B | 4 | 4 | 2 | 3 |
| Compar. A | 3 | 1 | 3 | 1 |

Example III

Figure 11:
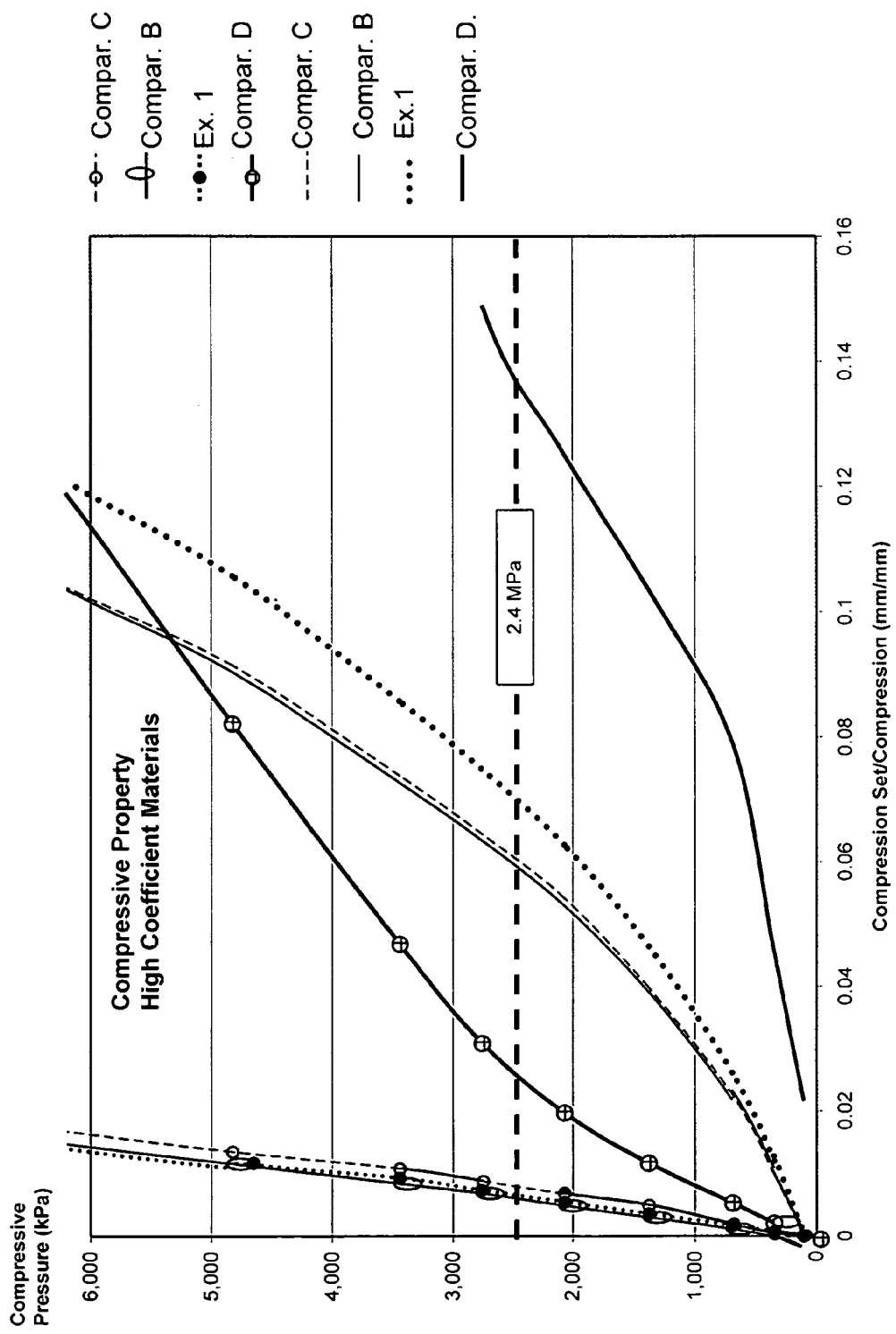
FIG. 11 is a graph showing the compression analysis for the Example 1, Compar. B, Compar. C, and Compar. D.

The compression analysis for the Example 1, Compar. B, Compar. C, and Compar. D. is shown in FIG. 11. The Compar. D. is a fibrous base material that has a secondary layer of symmetrical friction modifying material on a base material and has a 70% resin pick up. The Example 1 shows a desired elasticity which allows for more uniform heat dissipation during use of the friction material. The fluid can rapidly move through the porous structure. Further, the increased elasticity provides more uniform pressure (or even pressure distribvution 0 in the friction material such that uneven lining wear or separator plate "hot spots" are eliminated. The more elastic material of the present invention also means that there is no, or very little, permanent deformation of the friction material during use; i.e., the friction material tends to lose little or no thickness over time.

Example IV

Figure 12:
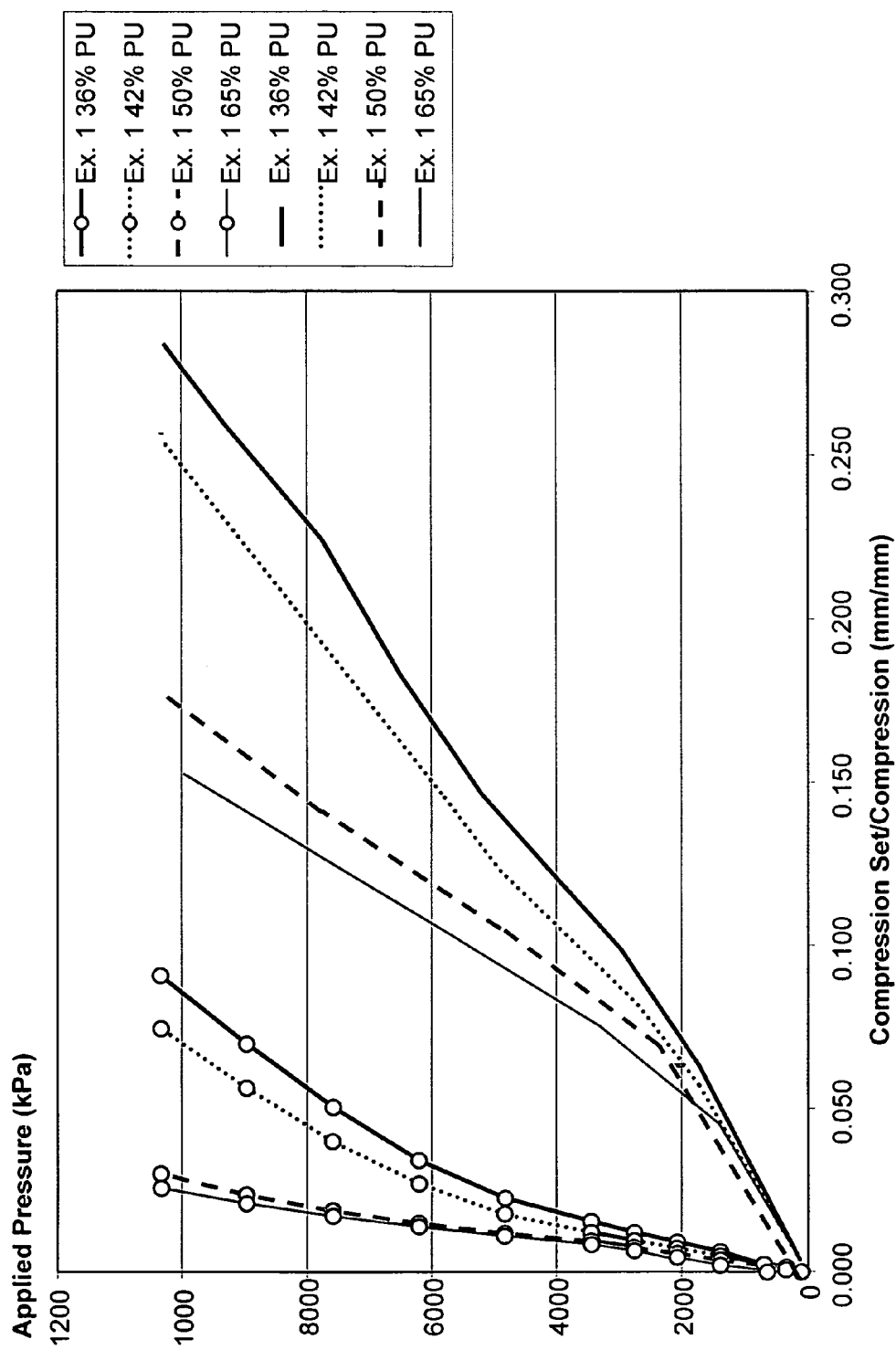
FIG. 12 is a graph showing the change in compression set/compression verses applied pressure for Example I materials having different amounts of resin pick up.

The change in compression set/compression verses applied pressure is shown in FIG. 12 for Ex. I materials having different amounts of resin pick up. As the resin pick up (% PU) increases, the lining compression decreases.

Example V

Figure 13:
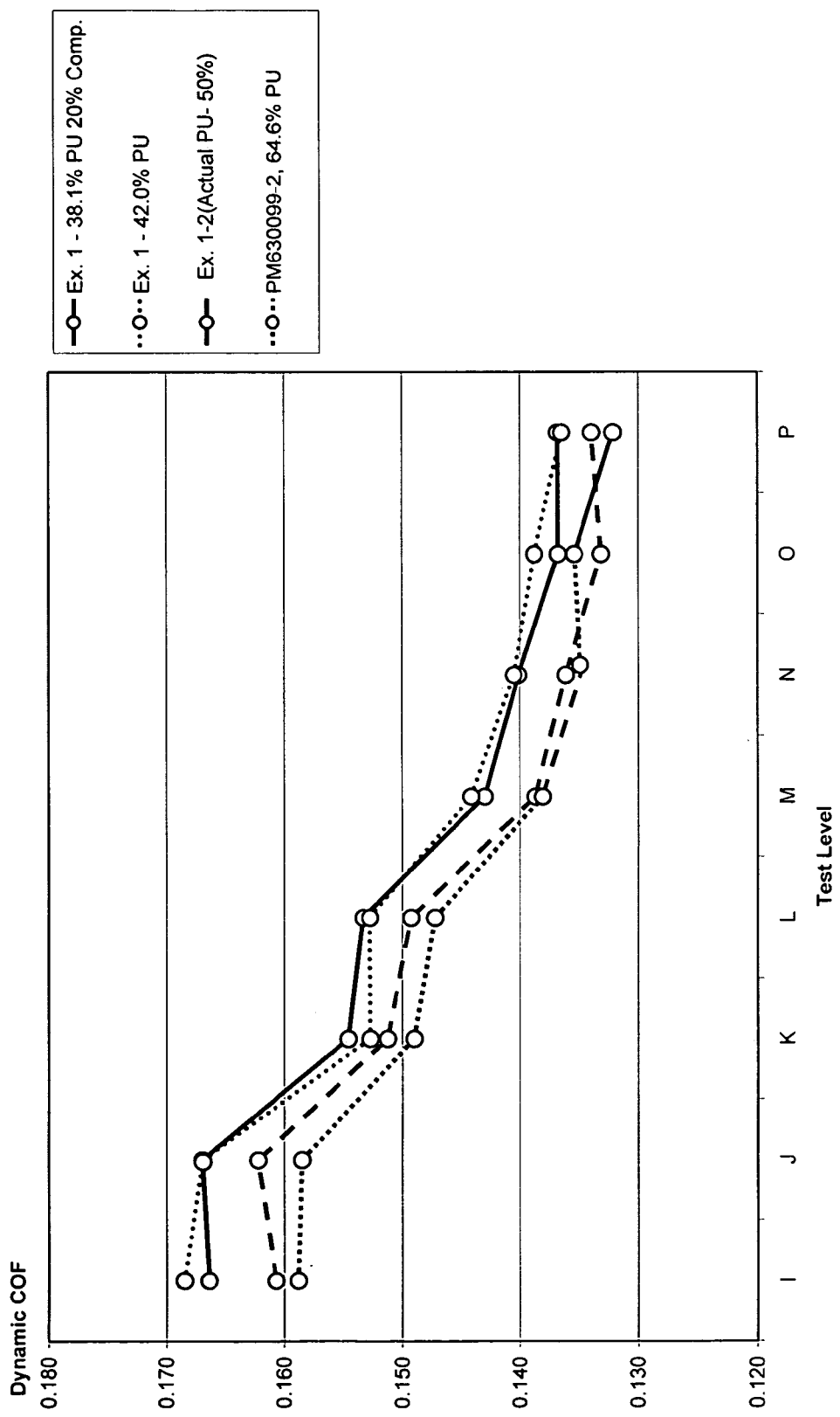
FIG. 13 is a graph showing the dynamic coefficient of friction for varying test levels for different fully fibrous base materials, Example 1-1 having different amounts of resin pick-up, and for Example 1-2 with a permeating, or penetrating, gradient of symmetrical shaped friction modifying particles.

The dynamic coefficient of friction for varying test levels for different fully fibrous base materials, Ex. 1-1, and for Example 1-2 with a permeating or penetrating gradient of symmetrical shaped friction modifying particles, is shown in FIG. 13. The resin pick up variation ranges from 38% to 65% and shows a COF variation within 3%.

Example VI

Figure 14A:
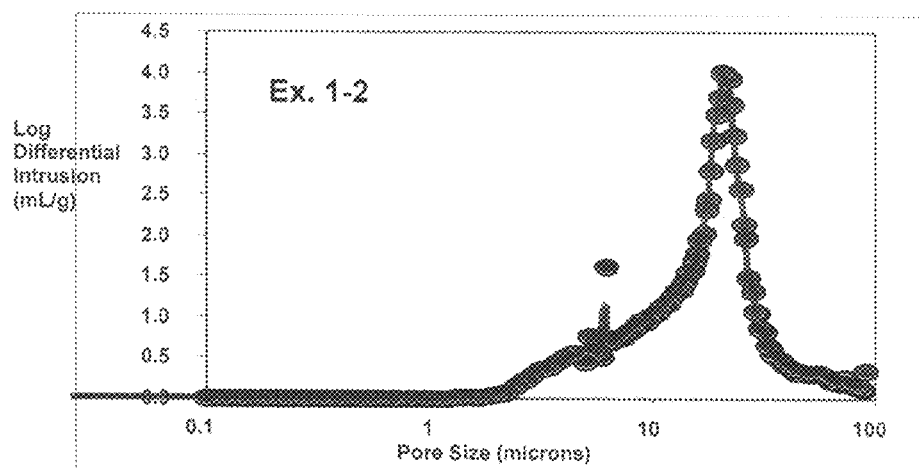
FIGS. 14a, 14b and 14c are log differential Hg intrusion scales comparing the Hg Intrusion verses pore size for the Example 1, the Compar. A and the Compar .B materials.
Figure 14B:
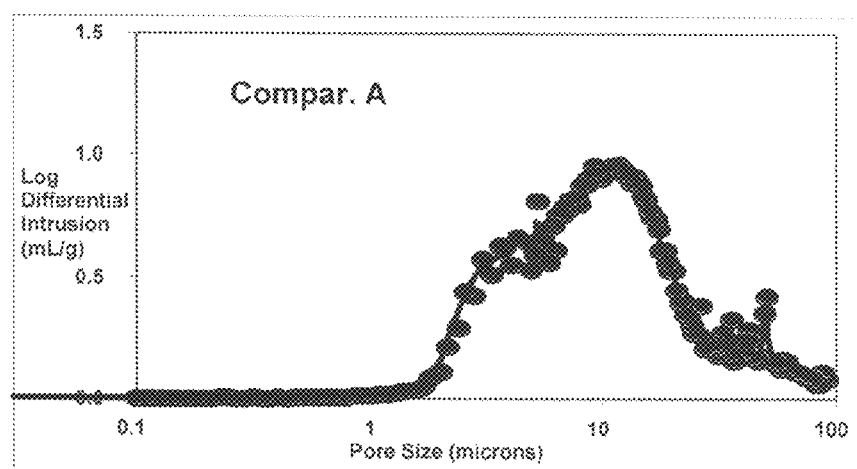
Figure 14C:
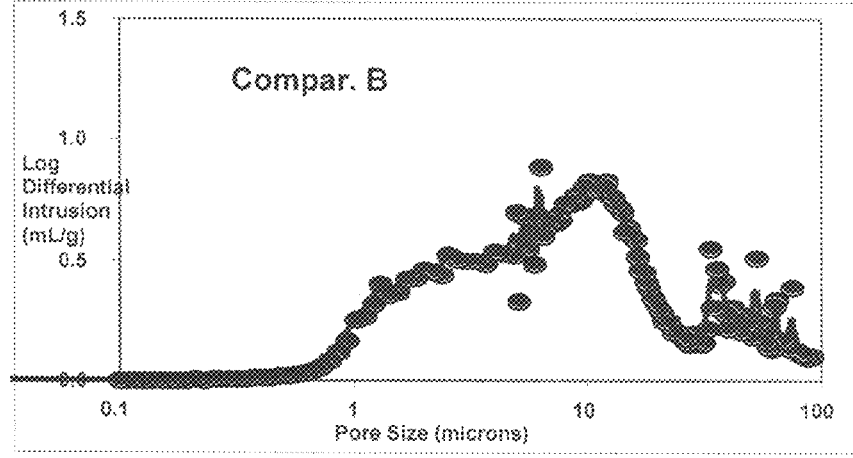

The pore size distribution for the Example 1 is different from the pore size distribution for the Compar. A and Compar. B examples. The Ex. 1 material has a mean pore size of about 25 to about 50 μm, as compared to about 10 μm for Compar. A and B. The Compar. A and B materials have a broad distribution of pore sized and a higher number of smaller pores as compared to the Ex. 1 material. The log differential Hg intrusion scales as shown in FIGS. 14a, 14b and 14c, compare the Hg Intrusion verses pore size for the Ex. 1 material and the Compar. A and Compar B materials. The Ex. 1 material is highly permeable and has a larger number of big pores.

Table 3 below shows the permeability (mDarcy) for the Ex. 1 and the Compar. A and B materials.

TABLE 3

| Permeabilty | |
|---|---|
| Examples | mDarcy |
| Compar. A | 1448 |
| Compar. B | 2153 |
| Example 1 | 2073 |

Example VII

Figure 15:
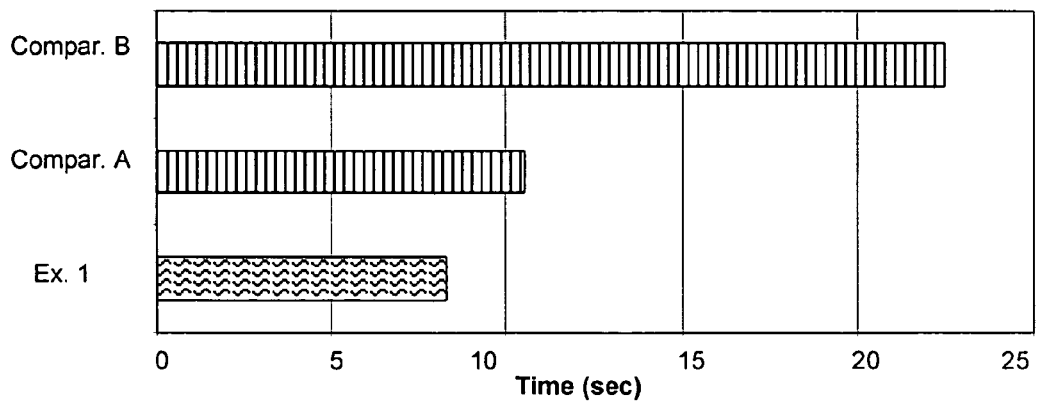
FIG. 15 is a graph showing the oil absorption for the Example 1 material, the Compar. A and the Compar. B. materials.

The oil absorption for the Ex. 1 material is shorter than for the Compar. A and Compar. B. materials, as shown in FIG. 15. During operation of a transmission system, the fluid tends to "break-down" or form debris particles. especially at high temperatures. These "break-down" particles tent to form a deposit in the surface of the friction material. These deposits in the friction material decrease the pore openings in the friction material. Therefore, when a friction material initially starts with larger pores, there are more pores remaining throughout the useful life of the friction material.

Example VIII

Figure 16:
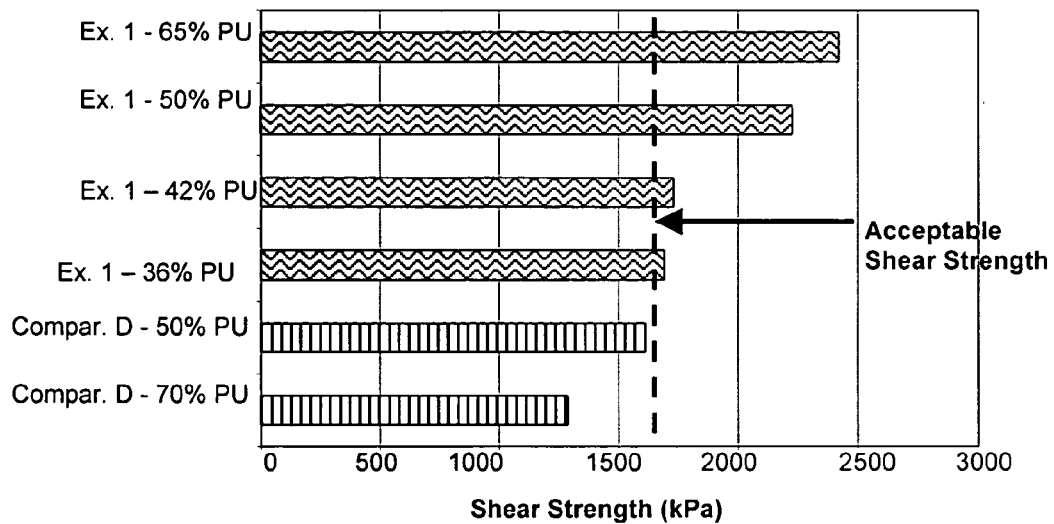
FIG. 16 is a graph showing the shear strength for Example 1 materials having different resin pickups and for Compar. D.

The shear strength for various materials having different resin pickup is shown in FIG. 16. The friction material of the present invention has acceptable shear strength which is needed to provide delamination resistance. The higher the shear strength, the better mechanical strength the friction material has which means that more pressure is needed to shear the friction material.

Example IX

Figure 17:
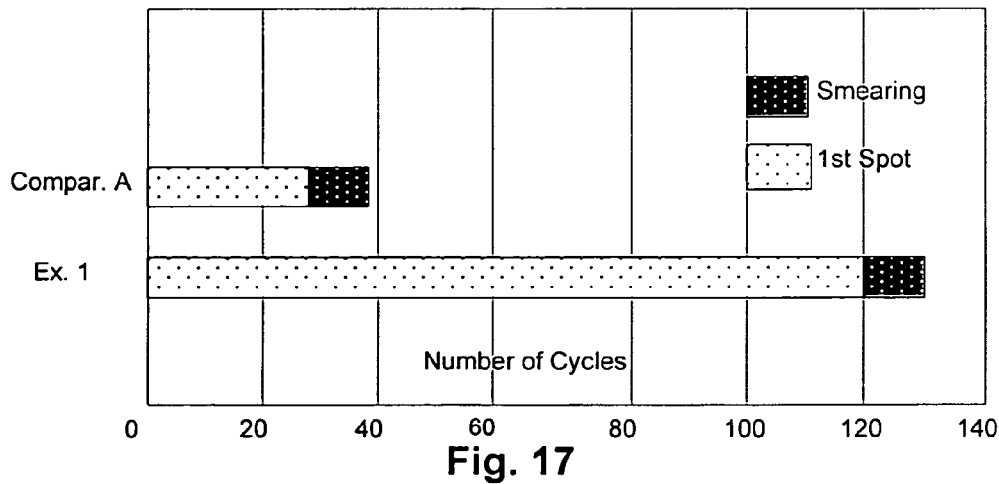
FIG. 17 is a graph showing hot spot comparison tests for the Example 1 material and the Compar. A material.

A hot spot comparison shows that the Ex. 1 material is at least about four times as durable in a first hot spot initiation test as the Compar. A material, as shown in FIG. 17. The hot spot cycles test is: 1$^{st}$ spot appearance and Smear by Procedure 10560. The friction material of the present invention has high durability, which provides increased thermal resistance to the friction material.

Example X

Figure 18:
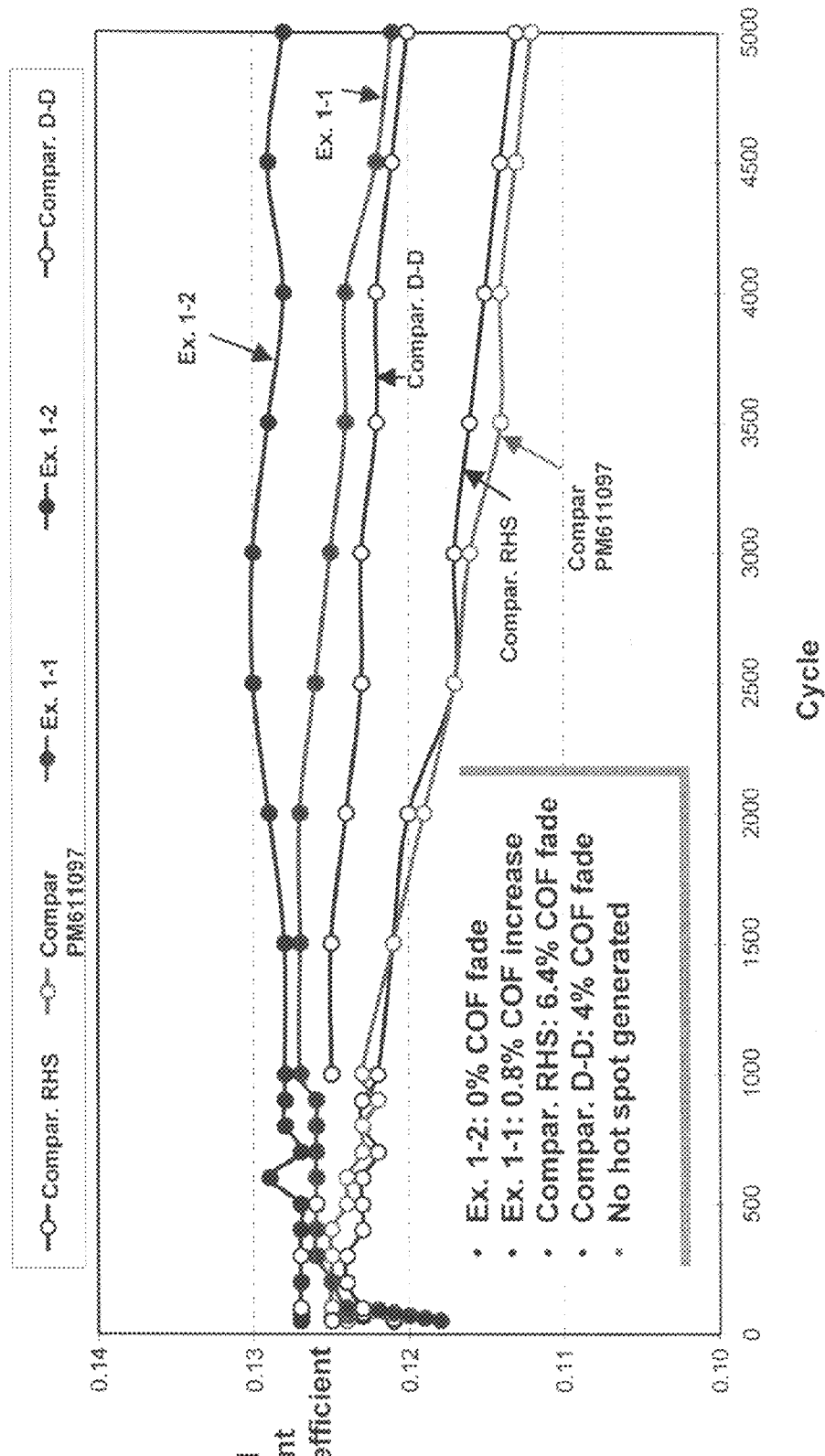
FIG. 18 is a graph showing the coefficient of friction stability in a 5000 cycle durability test for various materials.

The coefficient of friction stability test is shown in FIG. 18 for various materials where the midpoint coefficient of friction is measured for 5000 cycles. The friction material of the present invention has a relatively steady coefficient of friction, indicating that the material is very stable and there is no fall off of the COF as the number of cycles increases.

Example XI

Figure 19:
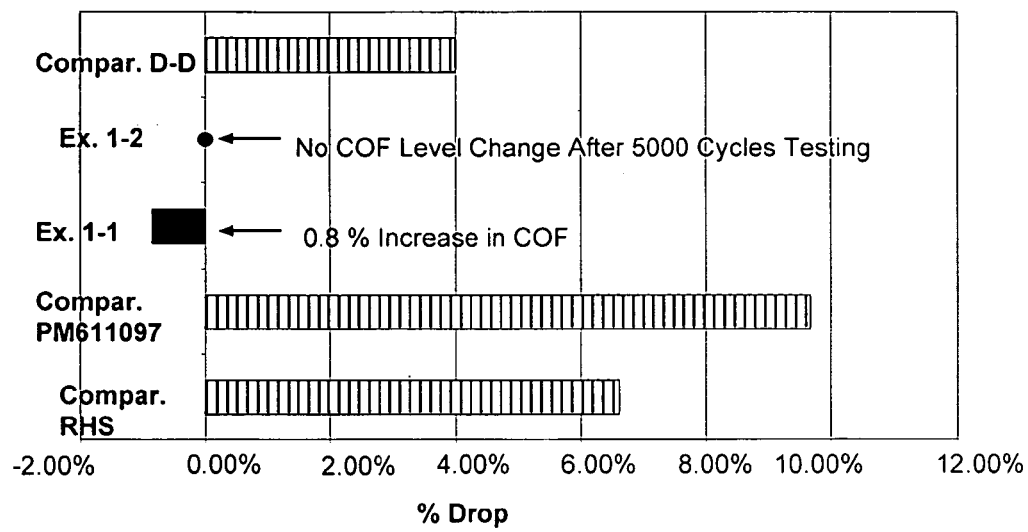
FIG. 19 is a graph showing the coefficient fade after 5000 cycles of testing for Example 1-1 and Example 1-2 as compared to conventional materials.

The coefficient fade after 5000 cycles of testing is shown in FIG. 19 for Example 1-1 and Example 1-2 as compared to conventional materials. There was no COF level change after 5000 cycles of testing for the materials of the present invention.

Example XII

Figure 20:
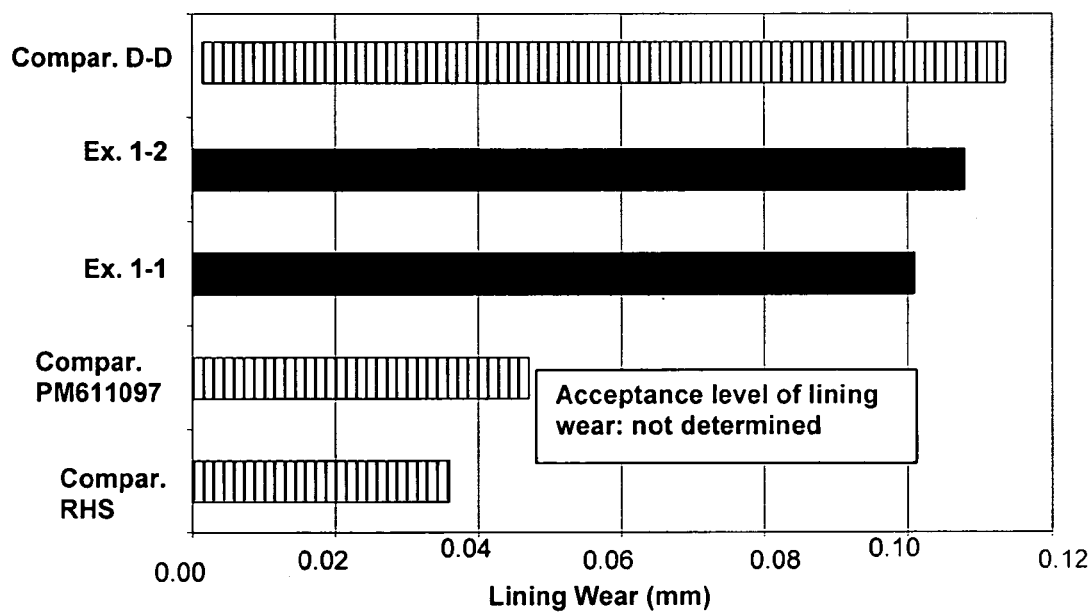
FIG. 20 is a graph showing the lining loss by wear after 5000 cycles of testing for Example 1-1 and Example 1-2 as compared to conventional materials.
Figure 21A:
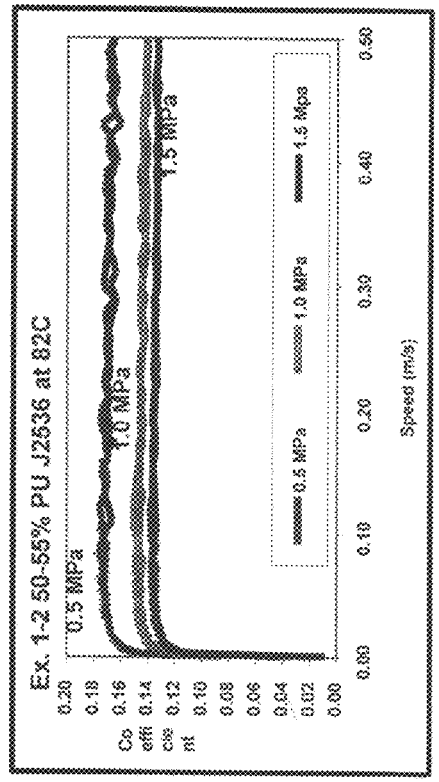
FIGS. 21a; 21b; 21c and 21d are graphs showing LVFA mu-V curves for the Example 1-2 at different temperatures.
Figure 21B:
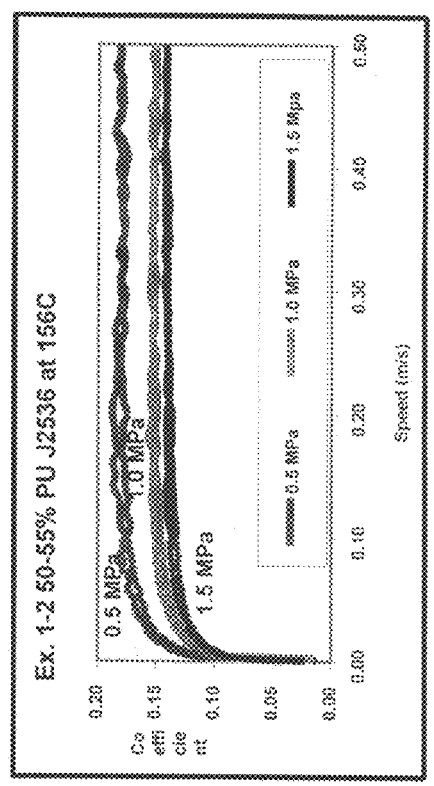
Figure 21C:
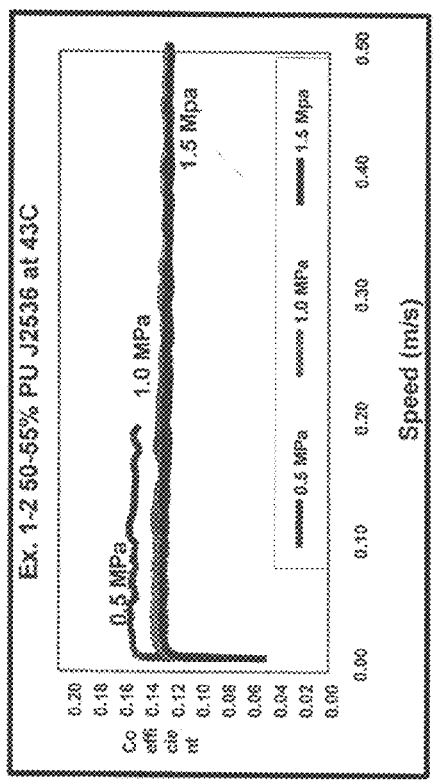
Figure 21D:
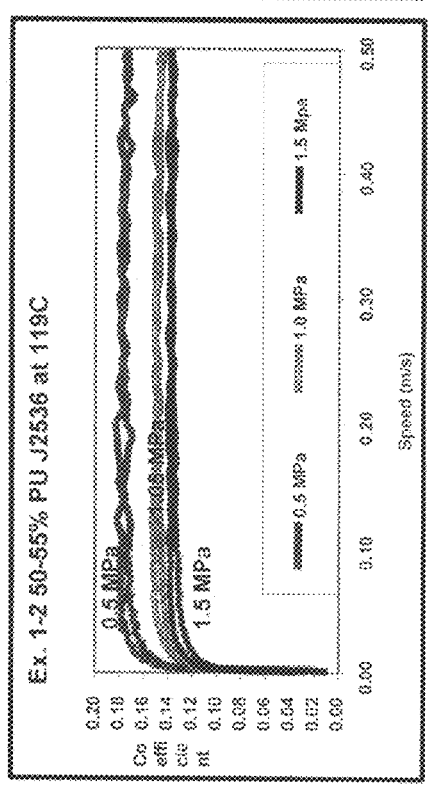

The lining loss by wear after 500 cycles of testing is shown in FIG. 20 for Example 1-1 and Example 1-2 as compared to conventional materials.

Example XIII

The LVFA mu-V curves for the Examples 1-2 at different temperatures are shown in FIGS. 21a, 21b, 21c and 21d. The data show that there are stable Mu-V curve shapes at the 80-160 C temperature ranges.

INDUSTRIAL APPLICABILITY

The present invention is useful as a high energy friction material for use with clutch plates, transmission bands, brake shoes, synchronizer rings, friction disks or system plates.

The above descriptions of the preferred and alternative embodiments of the present invention are intended to be illustrative and are not intended to be limiting upon the scope and content of the following claims.

We claim:
1. A friction material comprising a fibrous base material impregnated with at least one curable resin, the fibrous base material having a top surface and a desired amount of friction modifying particles dispersed within the fibrous base material in a penetrating gradient such that the concentration of friction modifying particles is highest near the top surface of the fibrous base material and progressively decreases away from the top surface, wherein the friction modifying particles are present within the fibrous base material at about 2% to about 15% by weight, based on the weight of the fibrous base material.

2. The friction material of claim 1, wherein the friction material comprises about 5% to about 15%, by weight, of friction modifying particles, based on the weight of the fibrous base material.

3. The friction material of claim 1, wherein the friction modifying particles comprise silica particles.

4. The friction material of claim 3, wherein the friction modifying particles comprise about 20% to about 35%, by weight, of silica particles, based on the total weight of the friction modifying particles.

5. The friction material of claim 1, wherein the friction modifying particles comprise symmetrically shaped particles.

6. The friction material of claim 1, wherein the friction modifying particles comprises diatomaceous earth.

7. The friction material of claim 1, wherein the friction modifying particles have an average size ranging from about 5 to about 100 microns.

8. The friction material of claim 1, wherein the fibrous base material defines pore diameters ranging in mean average size from about 10 to about 100 microns.

9. The friction material of claim 1, wherein the fibrous base material has readily available air voids of at least 50%.

10. A friction material comprising a fibrous base material impregnated with at least one curable resin, the fibrous base material having a top surface and consisting essentially of fibers and friction modifying particles, the fibers being a combination of aramid fibers, cotton fibers, carbon fibers, and cellulose fibers, and the friction modifying particles being dispersed within the fibrous base material in a penetrating gradient wherein there is a higher concentration of friction modifying particles towards the top surface of the fibrous base material, wherein the fibrous base material comprises about 60 to about 75%, by weight, aramid fibers; about 10 to about 15%, by weight, cotton fibers; about 5 to about 15%, by weight, carbon fibers; about 10 to about 20%, by weight, cellulose fibers; and, about 5 to about 20 lbs/3000 sq. ft., by weight, friction modifying particles, based on the weight of the fibrous base material.

11. The friction material of claim 10, wherein the cellulose fibers comprise wood fibers.

12. The friction material of claim 10, wherein the cellulose fibers comprises at least one of birch or eucalyptus fibers.

13. The friction material of claim 10, wherein the aramid fibers have a freeness of about 350 or less on the Canadian Standard Freeness index.

14. The friction material of claim 10, wherein the fibrous base material is impregnated at about 35 to about 40% resin, by weight, with at least one of: a phenolic resin, a modified phenolic resin, or a mixture of a phenolic resin and a silicone resin wherein the amount of silicone resin in the mixture ranges from approximately 5 to approximately 80%, by weight, based on the weight of the mixture wherein the phenolic resin is present in a solvent material and the silicone resin is present in a solvent material which is compatible with the solvent material of the phenolic resin.

15. The friction material of claim 10, wherein the friction modifying particles are symmetrically shaped and present in the penetrating gradient to a depth of at least 150 μm from the top surface of the fibrous base material.

16. A friction material comprising:
a fully fibrous base material impregnated with at least one curable resin, the fully fibrous base material having a top surface and a bottom surface and defining pores that range in mean average diameter from about 20 to about 50 μm; and
a desired amount of friction modifying particles dispersed within the fully fibrous base material in a penetrating gradient such that the concentration of friction modifying particles is highest near the top surface of the fully fibrous base material and progressively decreases towards the bottom surface of the fully fibrous base material to a depth of at least 150 μm away from the top surface.

17. The friction material of claim 16, wherein the friction modifying particles are present at about 0.2 to about 20%, by weight, based on the weight of the fully fibrous base material, and wherein the friction modifying particles comprise at least one of silica or carbon particles.

18. The friction material of claim 16, wherein the friction modifying particles comprise symmetrically shaped silica particles.

19. The friction material of claim 16, wherein the fully fibrous base material comprises about 60 to about 75%, by weight, aramid fibers; about 10 to about 15%, by weight, cotton fibers; about 5 to about 15%, by weight, carbon fibers; about 10 to about 20%, by weight, cellulose fibers; and, about 5 to about 20 lbs/3000 sq. ft., by weight, friction modifying particles, based on the weight of the fully fibrous base material.

20. The friction material of claim 16, wherein the at least one curable resin comprises a phenolic resin, a phenolic-silicone resin, an epoxy modified phenolic resin, or combinations thereof.

21. A process for producing a friction material comprising: forming a fully fibrous base material, permeating the fully fibrous base material with friction modifying particles and forming a gradient of friction modifying particles dispersed within the fully fibrous base material, the friction modifying particles being present at about 0.2 to about 20%, by weight, based on the weight of the fully fibrous base material, and impregnating the permeated fibrous base material with a phenolic resin, phenolic-based or phenolic-silicone resin mixture, and thereafter curing the impregnated fibrous base material at a predetermined period of time.

* * * * *